US009851196B2

(12) United States Patent
Smith

(10) Patent No.: US 9,851,196 B2
(45) Date of Patent: Dec. 26, 2017

(54) SENSOR

(71) Applicant: Rememdia LC, Salt Lake City, UT (US)

(72) Inventor: Fraser M. Smith, Salt Lake City, UT (US)

(73) Assignee: Rememdia LC, Salt Lake City, UT (US)

(*) Notice: Subject to any disclaimer, the term of this patent is extended or adjusted under 35 U.S.C. 154(b) by 223 days.

(21) Appl. No.: 14/690,352

(22) Filed: Apr. 17, 2015

(65) Prior Publication Data
US 2016/0305763 A1 Oct. 20, 2016

(51) Int. Cl.
G01B 11/00 (2006.01)
G01D 5/26 (2006.01)
G01D 5/34 (2006.01)

(52) U.S. Cl.
CPC ........... *G01B 11/002* (2013.01); *G01D 5/262* (2013.01); *G01D 5/34* (2013.01)

(58) Field of Classification Search
USPC .................................................. 356/600–640
See application file for complete search history.

(56) References Cited

U.S. PATENT DOCUMENTS

| 4,514,858 A * | 4/1985 | Novak | B23Q 1/36 250/491.1 |
| 4,611,292 A * | 9/1986 | Ninomiya | B25J 19/023 348/94 |
| 4,753,569 A * | 6/1988 | Pryor | A01B 69/008 250/201.1 |
| 4,843,372 A * | 6/1989 | Savino | G01B 11/16 340/533 |
| 4,853,771 A * | 8/1989 | Witriol | B25J 9/1697 235/375 |
| 4,891,526 A * | 1/1990 | Reeds | G03F 7/70716 250/442.11 |
| 5,059,013 A * | 10/1991 | Jain | G02B 27/0025 359/503 |
| 5,404,132 A * | 4/1995 | Canty | E04B 1/98 250/222.1 |
| 5,430,643 A * | 7/1995 | Seraji | B25J 9/1643 318/568.11 |

(Continued)

*Primary Examiner* — Tri Ton
*Assistant Examiner* — Jarreas C Underwood
(74) *Attorney, Agent, or Firm* — Volpe and Koenig, P.C.

(57) ABSTRACT

A sensor comprising a light component in support of a light source operable to direct a beam of light onto an imaging device having an image sensor, such as a CCD or CMOS or N-type metal-oxide-semiconductor (NMOS or Live MOS) sensor. The sensor can also comprise an imaging device positioned proximate to the light component and operable to receive the beam of light, and to convert this into an electric signal, wherein the light component and the imaging device are movable relative to one another, and wherein relative movement of the light component and the imaging device is determinable in multiple degrees of freedom. The sensor can also comprise a light deflecting module designed to deflect light from a light component onto the imaging device. The light sources and the resulting beams of light therefrom can comprise a number of different types, orientations, configurations to facilitate different measurable and determinable degrees of freedom by the sensor.

29 Claims, 17 Drawing Sheets

(56) References Cited

U.S. PATENT DOCUMENTS

| | | | | |
|---|---|---|---|---|
| 5,579,444 A * | 11/1996 | Dalziel | ............... | B25J 9/1697 |
| | | | | 382/153 |
| 5,610,719 A * | 3/1997 | Allen | ............... | G01B 11/306 |
| | | | | 250/201.4 |
| 5,684,596 A * | 11/1997 | Eslinger | ............... | G01B 11/16 |
| | | | | 356/228 |
| 2003/0174865 A1 * | 9/2003 | Vernon | ............... | G06K 9/2018 |
| | | | | 382/105 |
| 2005/0190451 A1 * | 9/2005 | Hansen | ............... | G02B 5/0221 |
| | | | | 359/613 |
| 2010/0047001 A1 * | 2/2010 | Montierth | ............... | H04N 1/10 |
| | | | | 400/76 |
| 2011/0043446 A1 * | 2/2011 | Spears | ............... | G06F 3/0325 |
| | | | | 345/156 |
| 2015/0347801 A1 * | 12/2015 | Svetal | ............... | G06K 7/1447 |
| | | | | 235/454 |
| 2016/0076936 A1 * | 3/2016 | Schoch | ............... | G01J 1/4228 |
| | | | | 250/349 |

* cited by examiner

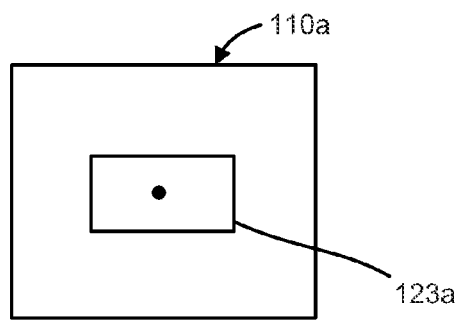
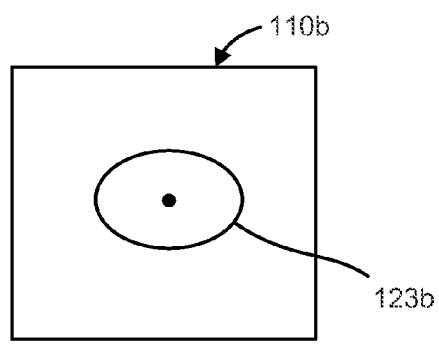
FIG. 8A     FIG. 8B
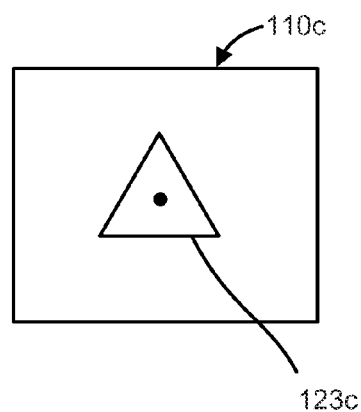
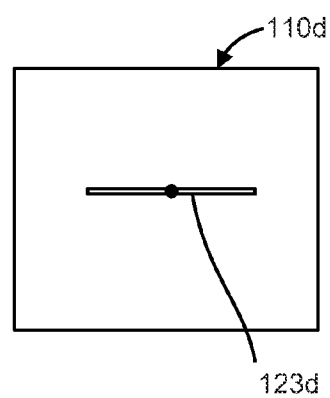
FIG. 8C     FIG. 8D

SENSOR

BACKGROUND

Sensors are used in a wide range of applications and are adapted to measure a wide variety of quantities. Many sensors can determine a desired quantity using a displacement measurement, such as a position sensor, a strain gage, a load cell, an accelerometer, an inertial measurement unit, a pressure gage, etc.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 8A-8D illustrate different cross-sectional shapes of light beams incident on an image sensor of an imaging device.

DETAILED DESCRIPTION

Figure 1:
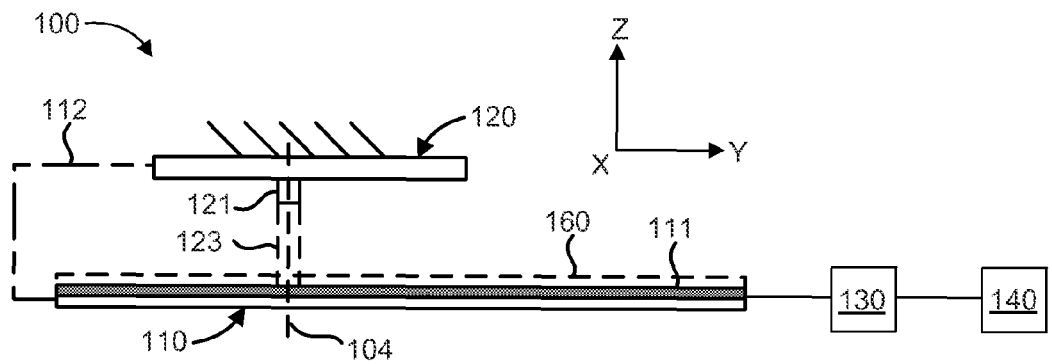
FIG. 1 is a side schematic view of a sensor in accordance with an embodiment of the present disclosure.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although typical sensors are generally effective for a given purpose, they often have substantially different resolutions in one or more degrees of freedom. There is often one preferred degree of freedom that possesses substantially greater resolution than one or more of the other degrees of freedom. Additionally, obtaining measurement redundancy and/or measurements in multiple degrees of freedom can significantly increase size, complexity, and/or cost, which can preclude using redundant or multiple degree of freedom sensors in some applications. Thus, redundant sensors or multiple degree of freedom sensors would likely be more readily utilized in the event they were able to provide size, complexity, and/or cost within practical limits, such as those approximating single degree of freedom sensors.

Accordingly, a sensor is disclosed that can provide for redundancy and/or measurement in multiple degrees of freedom without significantly increasing size, complexity, or cost. In one aspect, the sensor can be adapted to measure any given quantity that can be determined using a displacement measurement. The sensor can comprise a light component in support of a light source operable to direct a beam of light; an imaging device positioned proximate to the light component and operable to receive the beam of light, and to convert this into an electric signal, wherein the light component and the imaging device are movable relative to one another, wherein relative movement of the light component and the imaging device is determinable in multiple degrees of freedom. In some examples, the light source can comprise a single light source operable to generate a single beam of light in six degrees of freedom. Additional light sources can be included that are each configured to generate additional beams of light.

In another aspect, the present disclosure describes a sensor comprising at least one light source operable to direct a beam of light; an imaging device operable to receive the beam of light, and to convert the beam of light into an electric signal; a light deflection module proximate the imaging device operable to receive the beam of light and to deflect the beam of light onto the imaging device, wherein the light deflection module and the imaging device are movable relative to one another; wherein relative movement of the light deflection module and the imaging device is determinable in multiple degrees of freedom.

In still another aspect, the present disclosure describes a sensor comprising a light component in support of at least one light source operable to emit a beam of light; an imaging device operable to receive the beam of light, and to convert the beam of light into at least one electric signal; a light location module configured to receive the at least one electric signal and determine a location of the beam of light on the imaging device; and a position module configured to determine a relative position of the imaging device and the light component based on the location of the beam of light on the imaging device, wherein the beam of light comprises an annular configuration having at least two edges at the imaging device, such that more than one light distribution exists about the imaging device, the imaging device converting the light into multiple electric signals.

In still another example, a sensor can comprise a support structure; an imaging device positioned proximate the support structure, the support structure and the imaging device being movable relative to one another in at least one degree of freedom; a fiduciary disposed about the support structure and operative to define, at least in part, an image having image indicia identifiable by the imaging device, wherein a signal generated by the imaging device is based substantially on the fiduciary, and wherein an aspect of the fiduciary relative to the imaging device is caused to change with the relative movement of the support structure and the imaging device; and a position module configured to determine a relative position of the imaging device and the support structure based on the position of the fiduciary relative to the imaging device.

In still another example, a sensor system can comprise an object to be sensed; a sensor disposed about the object, the sensor comprising an imaging device positioned proximate to a surface of at least a portion of the object, the object and the imaging device being movable relative to one another in at least one degree of freedom; and a fiduciary disposed about the surface of the object and identifiable by the imaging device, wherein an aspect of the fiduciary relative to the imaging device is caused to change with the relative movement of the support structure and the imaging device, and wherein the sensor is actuatable upon relative movement between the object and the imaging device to facilitate determination of the change in the aspect of the fiduciary.

The present disclosure further describes a method for facilitating a displacement measurement, comprising providing a light component in support of a light source operable to direct a beam of light; providing an imaging device positioned proximate to the light component and operable to receive the beam of light, and to convert this into an electric signal, wherein the light component and the imaging device are movable relative to one another; and facilitating relative movement of the imaging device and the light component.

The present disclosure still further describes a method for facilitating a displacement measurement, comprising providing at least one light source operable to direct a beam of light; providing an imaging device operable to receive the beam of light, and to convert the beam of light into an electric signal; providing a light deflecting module proximate the imaging device operable to receive the beam of light and to deflect the beam of light onto the imaging device, wherein the light deflecting module and the imaging device are movable relative to one another, wherein relative movement of the light deflecting module and the imaging device is determinable in multiple degrees of freedom.

One example of a sensor 100 is illustrated schematically in FIGS. 1 and 2 and 4-8. The sensor 100 can comprise an imaging device 110. The imaging device 110 can comprise or otherwise be operable with an image sensor 111, such as a pixel sensor, photo sensor, or any other suitable type of imager that can convert light into electrical signals. In one aspect, the imaging device 110 can comprise an active pixel sensor having an integrated circuit containing an array of pixel sensors, wherein each pixel contains a photodetector and an active amplifier. Circuitry next to each photodetector can convert the light energy to a voltage. Additional circuitry may be included to convert the voltage to digital data. One example of an active pixel or image sensor is a complementary metal oxide semiconductor (CMOS) image sensor. In another aspect, the image device 110 can comprise a charge-coupled device (CCD) image sensor. In a CCD image sensor, pixels can be represented by p-doped MOS capacitors. These capacitors are biased above the threshold for inversion when light acquisition begins, allowing the conversion of incoming photons into electron charges at a semiconductor-oxide interface. The CCD is then used to read out these charges. Additional circuitry can convert the voltage into digital information. In still another aspect, the image device 110 can comprise a N-type metal-oxide-semiconductor (NMOS or Live MOS) type image sensor. The imaging device 110 can therefore include any suitable device or sensor that is operable to capture light and convert it into electrical signals, such as an imaging sensor typically found in digital cameras, cell phones, web cams, etc.

Figure 3A:
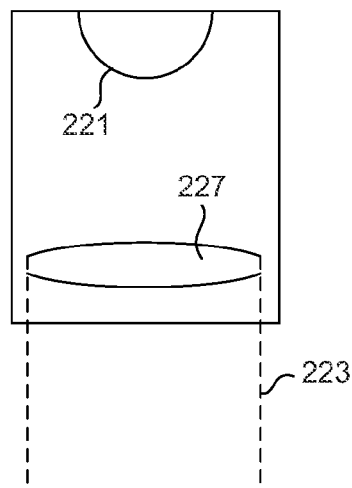
FIG. 3A illustrates a side schematic view of a light source of a sensor in accordance with an embodiment of the present disclosure.
Figure 3B:
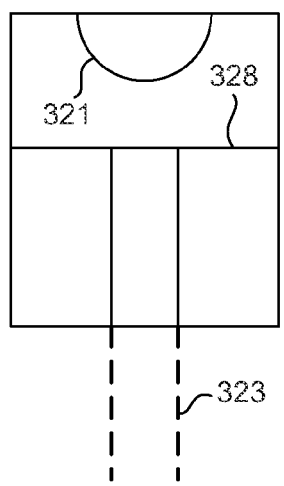
FIG. 3B illustrates a side schematic view of a light source of a sensor in accordance with another embodiment of the present disclosure.
Figure 3C:
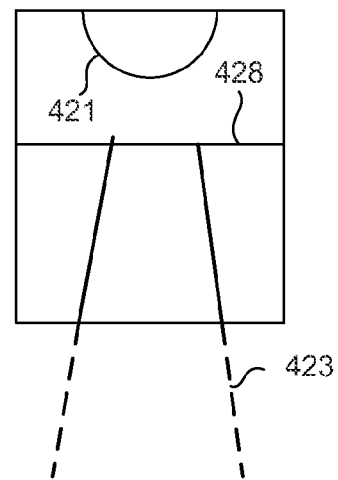
FIG. 3C illustrates a side schematic view of a light source of a sensor in accordance with another embodiment of the present disclosure.

The sensor 100 can also include a light component 120 in support of one or more light sources operable to direct beams of light respectively. In the example illustrated, the light component comprises a single light source 121 that operates to deliver a single light beam or beam of light 123. The light source 121 can comprises an LED, a laser, an organic LED, a field emission display element, a surface-conduction electron-emitter display unit, a quantum dot, a cell containing an electrically charged ionized gas, a fluorescent lamp, a hole through which light from a larger light source located external to the plane of light emission can pass, and/or any other suitable light source. FIG. 3A illustrates a lens 227 operable with a light source 221 to focus or direct light from the light source 221 into a suitable beam of light 223, in this case a columnar shaped beam of light. FIG. 3B illustrates a collimator 328 operable with a light source 321 to "narrow" light from the light source 321 into a suitable beam of light 323, also in this case a columnar beam of light. It is noted that a collimator can be used with any of the example sensors discussed herein to generate beams of light having other cross-sectional shapes. FIG. 3C illustrates a collimator 428 operable with a light source 421 to provide a beam of light having a nonuniform or tapering shape (e.g., conical) about its longitudinal axis. It should be recognized that a lens and a collimator can be used alone or in any combination with a light source to achieve a suitable beam of light.

The imaging device 110 can be positioned proximate the light component 120 and operable to directly receive the beam of light 123 and convert this into one or more electric signals. A light location module 130 can be configured to receive the electric signals and determine the various locations of the beam of light 123 on the imaging device 110. For example, pixels of the imaging device 110 can be individually addressed such that the light intensity on each individual pixel may be known or determined by the light location module 130.

The imaging device 110 and the light component 120 can be movable relative to one another in one or more degrees of freedom, and about different axes. Thus, a position module 140 can be configured to determine a relative position of the imaging device 110 and the light component 120 based on the various locations of the beam of light 123 on the imaging device 110, such as movement from an initial or first position to one or more subsequent positions (e.g., position 2, 3, 4, . . . n). It is noted herein that the imaging device 110 and the light component 120 being movable relative to one another can comprise arrangements in which a) the light component is movable relative to a fixed imaging device, b) the imaging device is movable relative to a fixed light component, c) a movable imaging device and a movable light component. It is intended to be understood that any construction of the claims to ascertain their meaning is to include such arrangements. The same is true for any other components or devices identified herein as being movable relative to one another, such as the light deflection module described below.

In one aspect, the imaging device 110 and the light component 120 can be coupled 112 to one another in a manner that facilitates relative movement. For example, the light component 120 can be "fixed" and the imaging device 110 can be supported about the light component 120 by a structure, device, or mechanism that can facilitate movement of the imaging device 110 relative to the light component 120. It should be recognized that in some embodiments the imaging device 110 can be "fixed" and the light component 120 movable relative thereto. The imaging device 110 and the light component 120 can be constrained for relative movement only in one or more selected degrees of freedom, such as translation in the X axis or rotation about the Z axis, etc. Any suitable arrangement of the imaging device 110 and the light component 120 is contemplated that facilitates relative movement of the imaging device 110 and the light component 120 in one or more desired degrees of freedom.

Relative movement of the imaging device 110 and the light component 120 can facilitate measurement of such relative movement, for example as a relative displacement and/or a rotation. Accordingly, a sensor in accordance with the present disclosure can be operable to measure or sense any quantity that can be based on, or that can be derived from, a relative movement, such as displacement, rotation, velocity, acceleration, etc. For example, a sensor as described herein can function as a position sensor, a strain gage, an accelerometer, a load sensor, or any other type of sensor that can utilize a relative motion to mechanically and/or computationally provide a measurement of a desired type. In one aspect, therefore, the sensor 100 can also include a clock 150 to measure elapsed time associated with a relative movement, as may be useful for determining velocity, acceleration, or other dynamic measurement quantities.

In addition, because the individual addresses of the pixels are known, the sensor 100 can be considered an "absolute" sensor. This attribute allows the sensor 100 to be powered off when not needed (i.e., to conserve energy) and powered on again to take a measurement or reading without needing to be initialized or otherwise calibrated to determine the relative position of the imaging device 110 and the light component 120.

The imaging device 110 can comprise a pixel array of any suitable size, dimension, aspect ratio, and/or pixel count. For example, the pixel array can be a one-dimensional array or a two-dimensional array, such as an array of pixels arranged in rows and columns. In one aspect, a range of motion of the sensor can be limited by the size of the imaging device, although multiple imaging devices can be disposed adjacent to one another to provide a greater range of motion for the sensor. In another aspect, a range of motion of the sensor can be impacted by the location and/or size of the light sources. Thus, light sources can be located and/or sized to accommodate the desired relative movements between the light component and the imaging device. It should be recognized that a sensor in accordance with the present disclosure can also be configured to produce substantially the same level of resolution in each degree of freedom.

In one aspect, a center location of the beam of light 123 on the imaging device 110 can be determined utilizing a statistical method applied to the location of the beam of light 123 on the imaging device 110. Such computations can be performed by the position module 140. For example, the beam of light 123 can be distributed across multiple pixels on the imaging device 110 and can exhibit an intensity gradient that can be analyzed using statistical methods to determine the center of the beam.

In another aspect, the imaging device 110 can be monochromatic or chromatic and the light source 121 can produce any suitable color of light, such as white, red, green, or blue. The color selectivity of chromatic pixels to specific light beam wavelengths can be utilized to effectively increase pixel populations, which can be used to determine the location of the center of the beam without degradation from a neighboring light beam on the imaging device. For example, three light sources (red, green, and blue) can be used in close proximity to one another with a chromatic imaging device in place of a single light source with a monochromatic imaging device to determine a relative movement of the light component 120 and the imaging device 110 without interference from one another. The chromatic imaging device can track or sense different color light beams separately, even though the light beams may overlap on the imaging device. Different parts of the imaging device corresponding to different colors can generate separate signals that can be used to determine the relative movement of the light source and the imaging device, such as by providing redundancy and/or additional data points for computation.

Thus, in one aspect, the imaging device can comprise a color separation mechanism 160. Any suitable color separation mechanism can be used, such as a Bayer sensor in which a color filter array passes red, green, or blue light to selected pixel sensors, a Foveon X3 sensor in which an array of layered pixel sensors separate light via the inherent wavelength-dependent absorption property of silicon, such that every location senses all three color channels, or a 3CCD sensor that has three discrete image sensors, with the color separation done by a dichroic prism.

It is noted that although many concepts and details pertaining to the present technology are discussed with respect to the sensor 100, these concepts and details are also applicable to the other sensors discussed herein. Indeed, the present disclosure is intended to incorporate these into the various embodiments discussed herein and to the sensor technology in general, where appropriate and where apparent to those skilled in the art.

Figure 2:
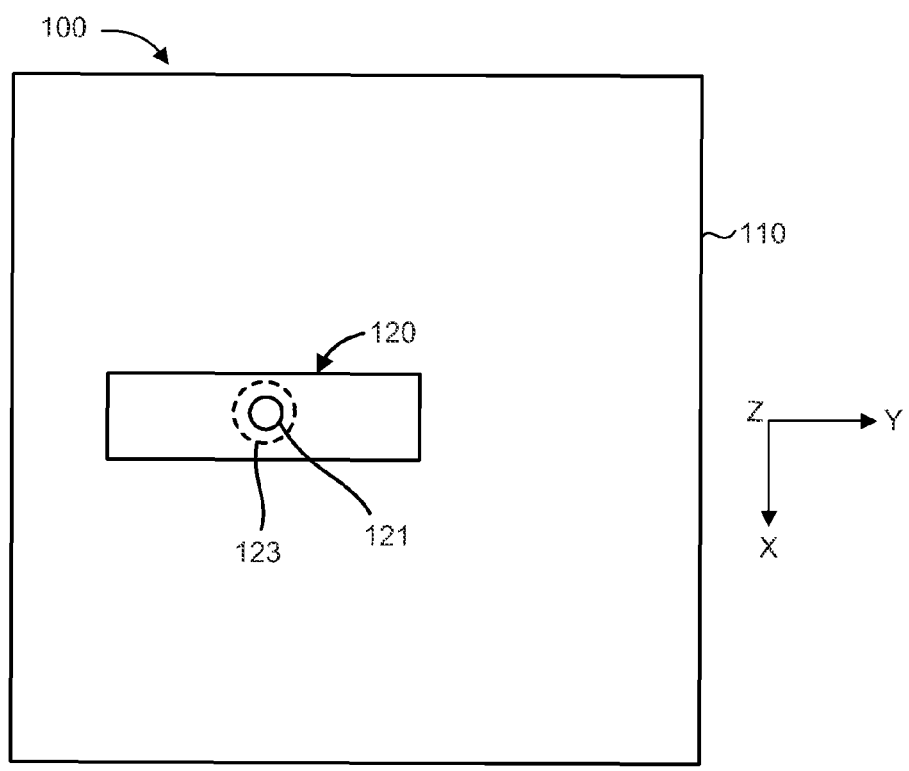
FIG. 2 is a top schematic view of the sensor of FIG. 1.

FIGS. 4-8, with continued reference to FIGS. 1 and 2, illustrate the sensor 100 in which relative movement between the imaging device 110 and the light component 120 is represented, and the various degrees of freedom in which the sensor is capable of measuring the relative movement. The single light source 121 produces the single light beam 123 that can be referred to generally as a "perpendicular" light beam, in that the light beam 123 (or a longitudinal axis of the light beam 123) is perpendicular or substantially perpendicular to the imaging device 110 in a normal or nominal relative orientation of the imaging device 110 and the light component 120, the light beam 123 comprising a longitudinal axis 104. As will be discussed below, the light beam can comprise various cross-sectional shapes, configurations or shapes along its longitudinal axis, etc., which can be generated or produced in a variety of ways.

In general, the single light source can be used to determine relative movement of the light component and the imaging device in multiple degrees of freedom depending upon the configuration of the various components making up the sensor. In some cases, depending upon the configuration of the light source and/or the beam of light, up to six degrees of freedom may be achieved, such as three translation degrees of freedom in the x, y and z directions, and three rotation degrees of freedom about the x, y and z axes. In any of these cases, the sensor can be caused to operate utilizing less than a total available number of degrees of freedom, such as may be called for in different circumstances.

Figure 4:
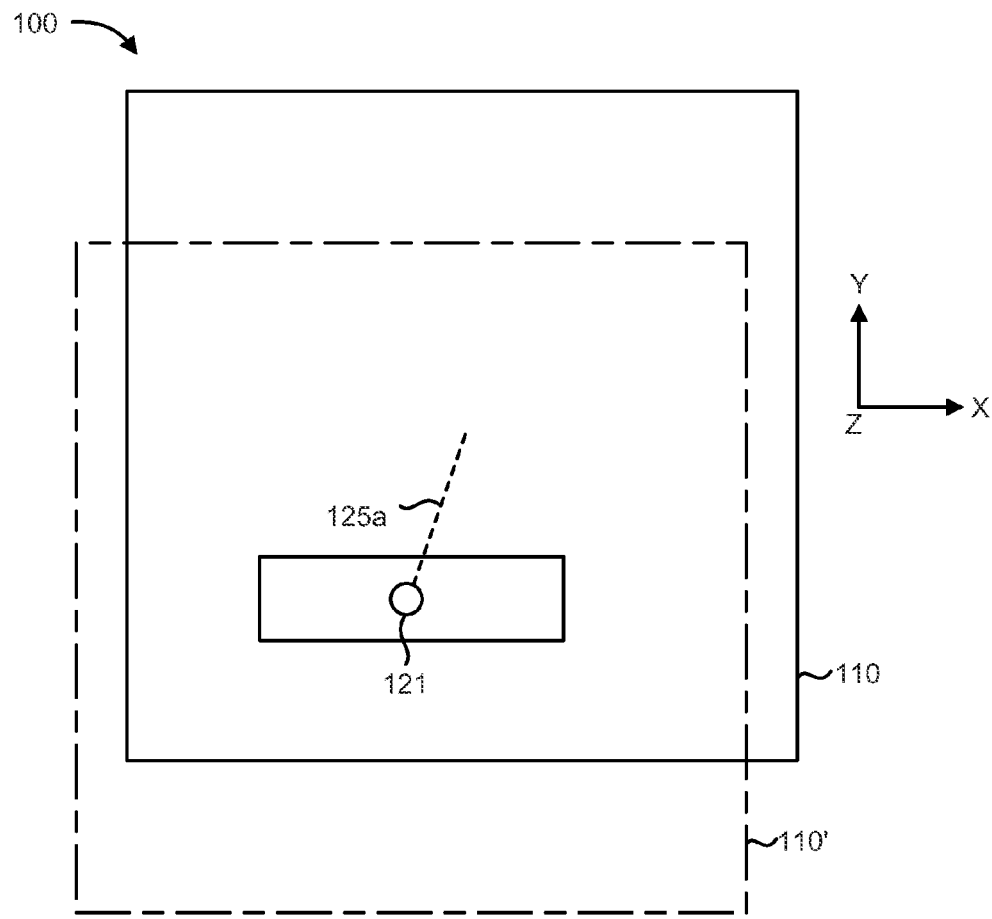
FIG. 4 is a top schematic view of the sensor of FIG. 1 undergoing relative movement of a light component and an imaging component in two translational degrees of freedom (along the x and y axes), in accordance with an embodiment of the present disclosure.
Figure 5:
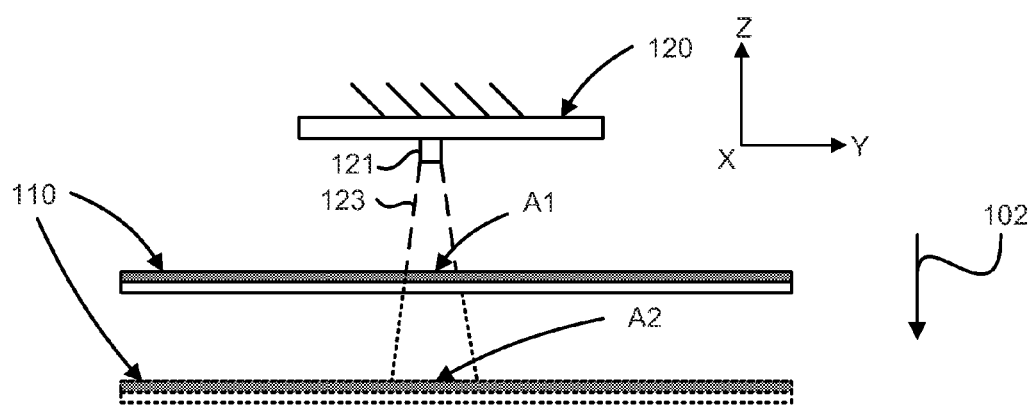
FIG. 5 is a side schematic view of the sensor of FIG. 1 undergoing relative movement of a light component and an imaging component in a translational degree of freedom along a z axis.

As shown in FIGS. 4 and 5 for example, the single light source 121, which directs the single light beam 123 substantially perpendicular to the X and Y translational degrees of freedom, can be used to determine relative movement of the imaging device 110 and the light component 120 in these two translational degrees of freedom. Movement of the light beam 123, as caused by the relative movement between the light component 120 and the imaging device 110, can trace a path 125a along the image sensor of the imaging device 110 as these components move relative to one another from an initial or first position to a second position.

The beam of light 123, as generated by the light source 121, can comprise different types or shapes. In one aspect, the beam of light 123 can comprise a columnar or cylindrical configuration (see FIG. 1) along a longitudinal axis of the beam of light and between the light source 121 and the imaging device 110. In another aspect, the beam of light 123 can comprise a nonuniform or tapering configuration along its longitudinal axis (e.g., conical) and between the light source and the imaging device 110 (see FIG. 5). In the columnar configuration, little or no measurements due to translation in the Z direction, or along the Z axis, will be readable as there will be no change in pixel illumination as a result of the movement (although the intensity of the light can change and be measureable). On the other hand, if the beam of light 123 is caused to have a conical or tapering shape (when viewed laterally along the x and/or y axes) relative movement of the imaging device 110 and the light component 120 in a Z direction or translational degree of freedom is determinable. For example (as shown in FIG. 5), as the imaging device 110 and the light component 120 move relative to one another, such as the imaging device moving away from the light component 120 in the direction 102 along the z-axis from a first position to a second position (the imaging device 110 being shown in dotted lines in the more distant, second position), the beam of light 123 can be caused to illuminate an area A2 (at the second position) on the imaging device 110 larger in size than an area A1 (at the first or initial, closer position) due to the increase in the size of the cross-sectional area of the cone at the terminus of the beam of light 123 about the imaging device 110, thus making translational movement along the z-axis determinable. It is noted that measurement along the z axis is also determinable in the direction opposite that shown by direction 102, where the area illuminated on the imaging device 110 decreases as the imaging device 110 approaches the light component 120 (going from area A2 to A1). Pixels along the path 125a (FIG. 4) and within the areas A1 and A2 (FIG. 5) can be used to determine, at least partially, relative motion of the imaging device 110 and the light component 120 in the three identifiable degrees of freedom discussed above. Based on this, all three translational degrees of freedom can be achieved if the sensor is appropriately configured.

As shown in FIGS. 6A-C, and 7, and with further reference to FIGS. 1 and 2, the imaging device 110 and the light component 120 can be movable relative to one another in one or more rotational degrees of freedom, wherein such relative movement can be determinable to provide additional measureable degrees of freedom, still while utilizing only a single light source 121. In the examples shown, the imaging device 110 and the light component can be configured to be rotatable relative to one another about any combination of the X, Y and Z axes, and depending upon the configuration of the sensor, rotational degree of freedom can be determinable in addition to the translational degrees of freedom discussed above. For example, relative rotation of the imaging device 110 and the light component 120 about the X axis can provide measurement in a first rotational degree of freedom. Relative rotation along the X axis causes the beam of light 123 to disperse across additional or different areas of the imaging device 110 as the imaging device 110 rotates from a first position parallel to the light component 120 to a second position non-parallel to the light component 120. Similarly, relative rotation of the imaging device 110 and the light component 120 about the Y axis can provide measurement in a second rotational degree of freedom. Rotation along the Y axis also causes the beam of light 123 to disperse across additional areas of the imaging device 110.

Figure 6A:
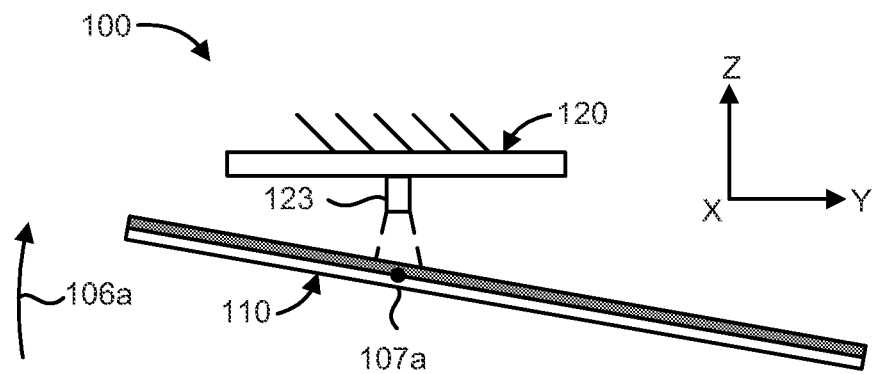
FIG. 6A is a side schematic view of the sensor of FIG. 1 undergoing relative movement of a light component and an imaging component in a rotational degree of freedom, in accordance with another embodiment of the present disclosure.
Figure 6B:
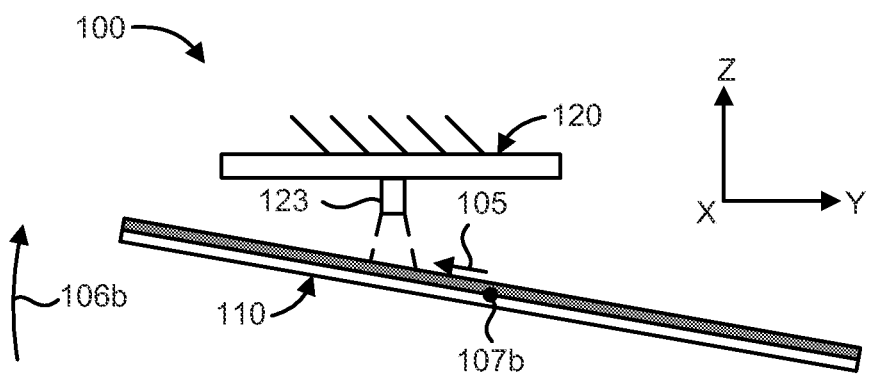
FIG. 6B is a side schematic view of the sensor of FIG. 1 undergoing relative movement of a light component and an imaging component in a rotational degree of freedom, in accordance with yet another embodiment of the present disclosure.
Figure 6C:
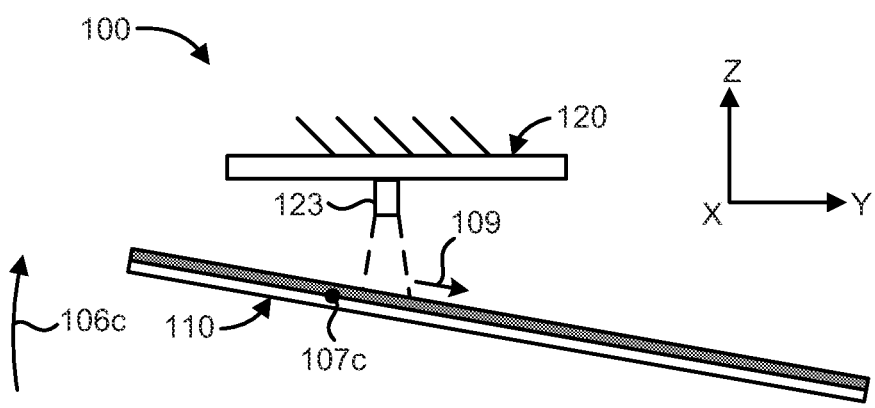
FIG. 6C is a side schematic view of the sensor of FIG. 1 undergoing relative movement of a light component and an imaging component in a rotational degree of freedom, in accordance with yet another embodiment of the present disclosure.

FIGS. 6A-6C illustrate further use of the single light beam 123 in determining relative movement of the imaging device 110 and the light component 120 in a rotational degree of freedom, in this case about the X axis. Although not specifically shown, similar determinable measurements can be made from relative rotation of the imaging device 110 and the light component 120 about the Y axis. FIGS. 6A-6C illustrate the imaging device 110 in a second position after rotation about the X axis in directions 106a-c, respectively, from an initial, first position parallel with the light component 120. The light beam 123 can be directed substantially perpendicular to the axis of the rotational degree of freedom. As shown in FIG. 6A, the imaging device 110 is shown rotated in direction 106a relative to the light component 120. The axis or center of rotation 107a is located about the X axis, and intersects a longitudinal axis 104 of the light beam 123. In this example, determinable measurements and resolution of the sensor 100 will depend, at least in part, upon the area of the light beam 123 about the imaging device 110 and the degree of relative rotation between the imaging device 110 and the light component 120. For example, if the light beam 123 comprises a columnar or conical shape, and the rotation of the imaging device 110 is limited to that shown in FIG. 6A, the light beam 123 could be caused to disperse across an additional or different area of the imaging device 110 as the cross-sectional area of the light beam 123 on the imaging device 110 changed from circular to oval. As such, this additional or different dispersed area can provide a determinable measurement along the X axis, thus giving the sensor an additional measurable rotational degree of freedom.

As shown in FIG. 6B, the imaging device 110 is shown rotated in direction 106b relative to the light component 120 from an initial position parallel with the light component 120. The axis of rotation 107b is located in a position offset from the longitudinal axis 104 of the light beam 123. In this configuration, light beam 123 moves in direction 105 along the imaging device 110 upon the rotation of the imaging device 110 in direction 106b, and in addition the cross-sectional area of the light beam changes (e.g., from circular to oval), thus causing the light beam 123 to disperse across additional or different areas of the imaging device 110. This dispersing of the light beam 123 across additional or different areas of the imaging device 110 can be used to determine that the imaging device 110 rotated relative to the light component 120 in direction 106a about a center of rotation 107a, thus providing the sensor 100 with an additional measurable rotational degree of freedom.

As shown in FIG. 6C, the imaging device 110 is shown rotated in direction 106c relative to the light component 120 from an initial position parallel with the light component 120. The axis of rotation 107c is located in a position offset from the longitudinal axis 104 of the light beam 123, which is on the other side of the light beam 123 as compared to that shown in FIG. 6B. In this configuration, light beam 123 moves in direction 109 along the imaging device 110 upon the rotation of the imaging device 110 in direction 106b, and in addition the cross-sectional area of the light beam 123 changes (e.g., from circular to oval). As such, the light beam 123 is caused to disperse across additional or different areas of the imaging device 110. This dispersing of the light beam 123 across additional or different areas of the imaging device 110 can be used to determine that the imaging device 110 rotated relative to the light component 120 in direction 106a about the center of rotation 107a, thus providing the sensor 100 with an additional measurable rotational degree of freedom. So far, this gives the sensor 100 five degrees of freedom.

In each of the examples of FIGS. 6A-6C, interrogation of the imaging device 110 and the signals created by the light beam 123 on the imaging device, can be used to determine that the imaging device 110 rotated relative to the light component 120 about the X axis. The relative rotation of the imaging device 110 and the light component 120 about the Y axis is not shown, but is similar in result to that for relative rotation about the X axis with the sensor configured as shown.

Relative rotational movement of the imaging device 110 and the light component 120 about the Z axis to obtain or provide a sixth determinable degree of freedom for the sensor 100 can be achieved in multiple ways with the single light source 121. In one aspect, the single light source 121 can be configured to, or can be operable with another structure, to emit a light beam 123 having a cross-sectional shape or area with a dimension in a first direction greater than a dimension in a different, second direction transverse to the first direction. For example, the beam of light 123 can comprise a length greater than a width. The first and second directions can be along axes intersecting through a center point of the cross-sectional shape. In another aspect, the single light source 121 can be configured to, or can be operable with another structure, to emit a light beam 123 having a cross-sectional shape having a dimension in one direction greater than a dimension in a second direction. In still another aspect, the single light source 121 can be configured to, or can be operable with another structure, to emit a light beam 123 having a cross-sectional shape defined by any shape configured to disperse light on additional or different areas of the imaging device 110 upon rotation about the Z axis and a center point located anywhere within the boundaries of the cross-sectional shape.

No matter how generated, by employing a beam of light having this type of shape, relative rotational movement between the imaging device 110 and the light component 120 along the Z axis will cause the light beam to disperse across additional or different pixels of the imaging device 110, thus providing a determinable rotational degree of freedom about the Z axis, and thus facilitating achievement of a sixth degree of freedom by the sensor 100 using a single light source and a single beam of light. These conditions or parameters can generally be described as a light beam having an oblong configuration, but this is not meant to be limiting in any way as the word oblong may not accurately describe all of the available or possible cross-sectional shapes the beam of light could comprise. Such a shape of light can be obtained by configuring a light source with such a configuration. Alternatively, the light source can emit light having any shape (e.g., a non-oblong (e.g., columnar) shape), yet be directed through a suitably shaped hole or aperture (or a suitable collimator) such that the light emitted from the aperture comprises the desired (e.g., oblong) shape.

Figure 7:
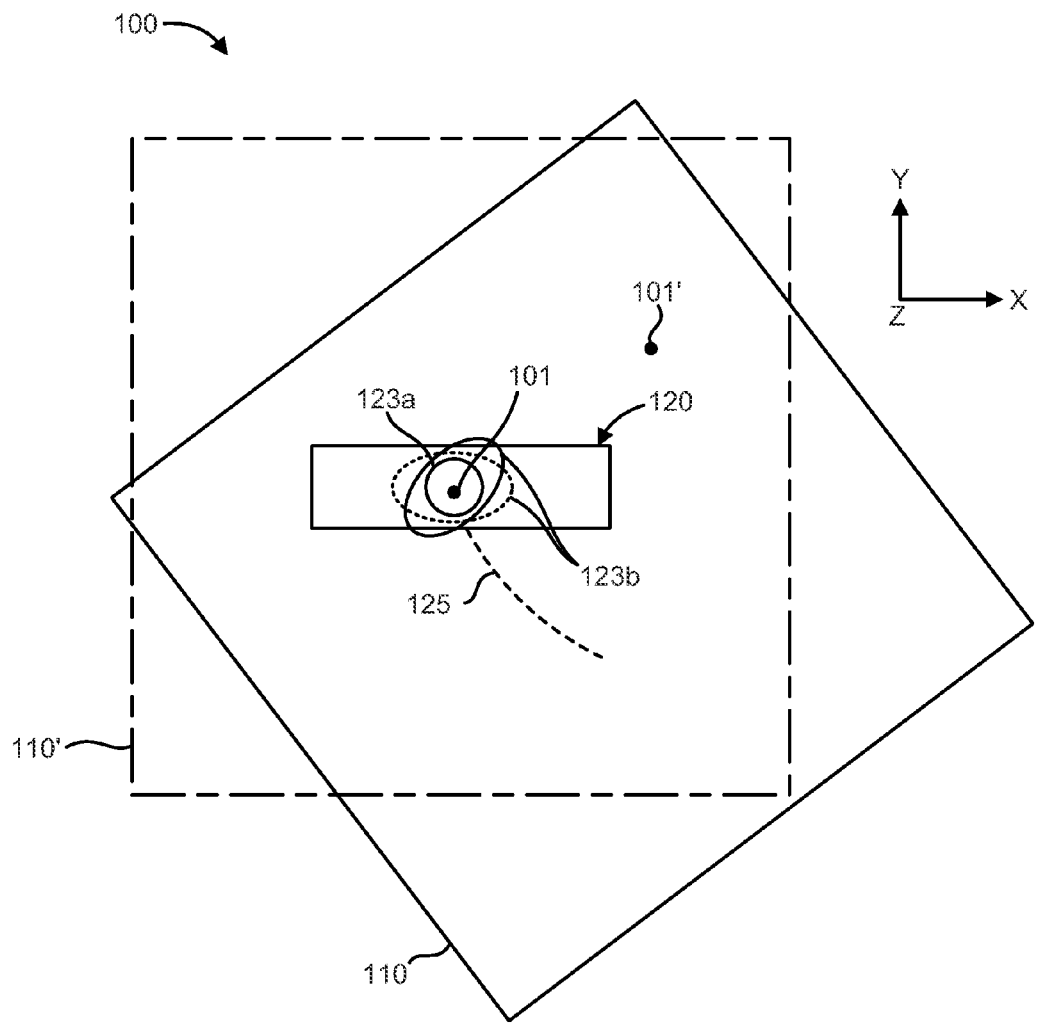
FIG. 7 is a top schematic view of the sensor of FIG. 1, illustrating different configurations of light beams in accordance with various examples of the present disclosure.

FIG. 7 illustrates one example of the sensor 100 comprising a single light source 121 configured to emit a light beam 123a comprising a circular cross-section, and to rotate about a point offset from a center point of the light beam 123. In this example, rotation of the imaging device about the Z axis and about center of rotation 101 will not register a measurement. In other words, no rotational degree of freedom about the Z axis is obtained as the light beam 123a is not caused to disperse across additional or different areas of the imaging device 110 upon relative rotation of the imaging device 110 and the light component 120. However, relative rotation about the center point 101' offset from the light beam 123a will cause the offset light beam 123a to trace a path 125 across the imaging device 110. Pixels along the path 125 of the light beam 123a can be interrogated to determine the relative motion of the imaging device 110 and the light component 120 about the Z axis. It is noted that as the rotation axis or center point 101' approaches the axis of the light beam 123a, the sensitivity of the sensor decreases as the imaging device is unable to detect as easily changes across the imaging device. Coincident rotation with the axis of the light beam 123a, as noted above does not yield a rotational measurement about the z axis. As such, a light beam having an oblong cross-sectional shape (or other similar cross-sectional configuration or shape) can be utilized to provide measurement about the Z axis as the oblong shape will have a length greater than a width or height, and thus will facilitate light dispersal across different or additional areas of the imaging device 110 upon relative rotation. It is noted herein that rotation of the imaging device 110 about center point 101 is not specifically shown. However, one skilled in the art will recognize the various possible relative positions of the imaging device and the light component upon rotation about such point.

On the other hand, FIG. 7 also illustrates an alternative light beam configuration, wherein the cross-sectional shape of the light beam 123b comprises a length dimension greater than a width dimension, which shape in this particular example comprises an oval. Indeed, relative rotation of the imaging device 110 and the light component 120 about the center points 101 will cause the light beam 123b to disperse across additional or different areas of the imaging device 110, as shown. This can be seen by the oval shaped light beam 123 represented in dotted lines in its initial position, and solid lines in its rotated position, wherein the light beam 123b disperses light across additional or different areas of the imaging device 110. Likewise, relative rotation of the imaging device 110 and the light component 120 about the center points 101' will cause the light beam 123b to disperse across additional or different areas of the imaging device 110 as it is caused to trace path 125.

It should be recognized that a sensor in accordance with the present disclosure can have multiple translational degrees of freedom and/or multiple rotational degrees of freedom. Additional light sources, over the single light source 121 of sensor 100, may help improve resolution of the sensor, in that there is more light movement across the imaging device and therefore more pixels to interrogate to obtain data that can be utilized to determine the relative movement of the imaging device and the light component. Depending upon the configuration of the sensor and the interrogation system, additional light sources may also allow for simplified calculation algorithms.

FIGS. 8A-8D illustrate different exemplary non-circular light beams 123a-d, respectively, having cross-sectional areas or shapes configured to facilitate determination of a rotational degree of freedom about the Z axis. FIG. 8A illustrates a light beam 123a having a rectangular cross-sectional shape, in which a length dimension is greater than a width dimension along respective axes intersecting at a center point. FIG. 8B illustrates a light beam 123b having an oval cross-sectional shape, in which a length dimension is greater than a width dimension along respective axes intersecting at a center point. FIG. 8C illustrates a light beam 123c having a triangular cross-sectional shape, in which a width dimension is greater than a length dimension along respective axes intersecting at a center point. FIG. 8A illustrates a light beam 123d in the form of a line, in which a length dimension is greater than a width dimension along respective axes intersecting at a center point. Of course, those cross-sectional shapes illustrated in the figures and described herein are not intended to be limiting in any way. Those skilled in the art will recognize other cross-sectional shapes exist that are capable of dispersing light across different areas of the imaging device 110 upon rotation about the Z axis.

Figure 9:
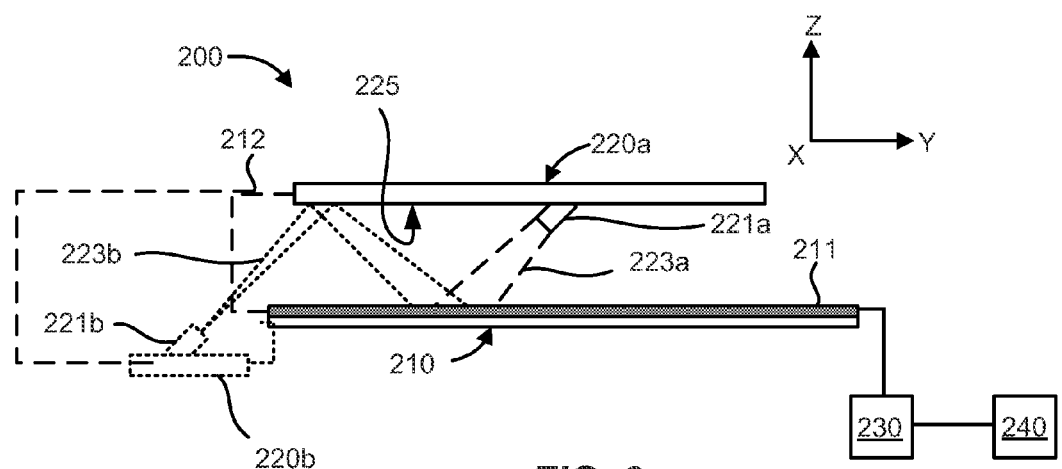
FIG. 9 is a side schematic view of a sensor in accordance with yet another embodiment of the present disclosure.

FIG. 9 illustrates a sensor in accordance with another example of the present disclosure. In this example, the sensor 200 can be similar to the sensor 100 described above, which description is incorporated here where appropriate and as recognized by those skilled in the art. The sensor 200 can comprises an imaging device 210. The imaging device 210 can comprise or otherwise be operable with an image sensor 211, such as a pixel sensor, photo sensor, or any other suitable type of imager that can convert light into electrical signals. The sensor 200 can also include a first light component 220a in support of one or more light sources operable to direct beams of light respectively. The first light component 220a and the imaging device 210 can be parallel to one another and configured to be moveable relative to one another in one or more degrees of freedom. For example, the first light component 220a can support a single light source 221a that operates to deliver a light beam or beam of light 223a onto the imaging device 210. Other components and functions of the sensor 100 discussed above, can also be implemented or incorporated into the sensor 200 as will be apparent to those skilled in the art. However, unlike the sensor 100 discussed above, the sensor 200 can be further or alternatively be configured such that the light source 221a is mounted on the light component 220a in a way (e.g., the light source 221a is mounted on an incline relative to the light component 220a) so as to direct the beam of light 223a onto the imaging device 210 at an incline, wherein the beam of light 223a has a longitudinal axis oriented on an incline relative to the imaging device 210, such that an angle of incidence of the beam of light 223a is on an incline relative to the imaging device 210.

The sensor 200 can alternatively comprise, or comprise in addition to the first light source 221a, a second light component 220b in support of a second light source 221b. In some aspects, the second light component 220b can be mounted or otherwise situated or disposed or located on the same side of the imaging device 210. In one aspect, the second light component 220b can be fixed relative to the imaging device 210, wherein the second light component 220b and the first light component 220a are movable relative to one another. The second light source 221b can be configured to direct a beam of light 223b onto the surface 225 of the first light component 120b, wherein the first light component 120b is configured to and capable of redirecting, reflecting, deflecting, etc. all or a portion of the beam of light 223b off of one of its surfaces, for example surface 225 toward, and onto the imaging device 210, and specifically the image sensor 211, and wherein the imaging device can convert the second beam of light to an electric signal receivable by the light location module in a similar manner as the first beam of light 223a. Likewise, the position module can be configured to determine a relative position of the imaging device and the light component based on the location of the first beam of light 223a and the second beam of light 223b on the imaging device 210. In one aspect, the surface 225 can be made of a reflective or semi-reflective material. In another aspect, the surface 225 can be coated with a coating facilitating all or partial reflection or deflection of the beam of light 223b. Examples of suitable materials can include, but are not limited to a metalized surface, a metalized surface configured to be resistant to oxidation, although this is not required. Some specific examples may include sputtered gold, platinum, palladium, aluminum, titanium, chromium, cobalt, magnesium, stainless steel, nickel, etc. Examples, of metals that could be used, but that could oxidize over time can include silver, iron, steel, tungsten, etc. The sputtering described above can be replaced with the application of foils or shim stock using any of the above-referenced materials. In other aspects, mirrored glass, mirrored polymers, etc. In other aspects, Mylar, a reflective polymer, or other polymers made with metal fillers could provide a reflective function. In the event that there is any scattering introduced by these materials, such artifacts can be corrected out since they would not possess the intensity of the primary light source. Surface 225 can be configured in other way as will be recognized by one skilled in the art where all or partial deflection/reflection of the beam of light 223b off of the first light component 220a and onto the imaging device 210 is facilitated.

Similar to the other embodiments discussed herein, the sensor 200 can be configured to function as a sensor by virtue of the relative movement between the first light component 220a, the second light component 220b and the imaging device 210. In one aspect, with the first light source 221a configured to direct an angled beam of light 223a onto the imaging device 210 and the image sensor 211, relative translational movement between the imaging device 210 and the first light component 220a along each of the x, y and z axes is measureable and determinable as movement in each of these directions will cause light to disperse across different portions of the image sensor 211 from an initial position. Furthermore, relative rotational movement between the imaging device 210 and the first light component 220a about each of the x, y and z axes is measureable and determinable as movement in each of these directions will also cause light to disperse across different portions of the image sensor 211 from an initial position. As such, with the sensor 200 configured as shown, the sensor 200 is capable of sensing measurements in six degrees of freedom. To be sure, rotation about the z axis is obtained by providing the beam of light 223a on an angle relative to the image sensor 211. This can cause the beam of light 223a to project or emit an oblong shaped beam onto the surface of the image sensor 211, such that upon rotation about the z axis, other pixels are caused to receive light, thus providing a determinable measurement. Another variable that goes along with the size of the oblong shaped beam is the intensity of the beam of light. The intensity dissipates as the light source and the imaging device move away from one another, so each of these variables are usable alone or in combination.

In another aspect, with the second light component 220b and the second light source 221b configured to direct a beam of light 223b onto the surface 225 of the first light component 220a and subsequently onto the imaging device 210 and the image sensor 211 as reflected (or otherwise deflected) from the surface 225 of the first light component 220a, and with the second light component 220b fixed relative to the imaging device 210, relative translational movement between the imaging device 210 and the second light component 220b along the z axis is measureable and determinable. In this configuration, translational movement along the x and y axes is not measureable as the second light component 220b and the imaging device 210 are fixed relative to one another, and movement by the second light component 220b along either of the x and y axes would not cause additional or other pixels on the image sensor 211 to be illuminated. Of course, it is contemplated that in another aspect, the sensor 200 can be configured such that the second light component 220b and the imaging device 210 are moveable relative to one another, which would provide determinable measurements from translational movement along each of the x, y and z axes.

Furthermore, in the situation where the second light component 220b is fixed relative to the imaging device 210, but that the imaging device 210 and the first light component 220a are moveable relative to one another, relative rotational movement between these components about the x and y axes is determinable. Rotation about the z axis will likely not yield a determinable measurement in this situation as the rotation of the first light component 220a about the z axis will not cause the reflected beam of light 223b to emit across other pixels. However, in the configuration in which the second light component 220b and the imaging device 210 are moveable relative to one another, relative rotational movement about each of the x, y and z axes is measurable and determinable.

Of course, each of the first and second light components 220a and 220b can be used in combination in a single sensor 200, with these being fixed or movable relative to one another and the imaging device 210 as suits a particular application. Moreover, those skilled in the art will recognize that any number of first and/or second light sources 221a and 221b can be used within the sensor 200.

In one aspect, the imaging device 210 and the first and second light components 220a and 220b can be coupled 212 to one another in a manner that facilitates relative movement between any combination of them. Likewise, the second light component 220b and the imaging device 210 can be supported within the sensor 200 such that they are fixed relative to one another.

The sensor 200 can further comprise a light location module 230, a position module 240 and a clock 250 in a similar manner as discussed above. Similarly, interrogation and function of the sensor 200 can be accomplished in a similar was as described elsewhere herein.

Figure 10:
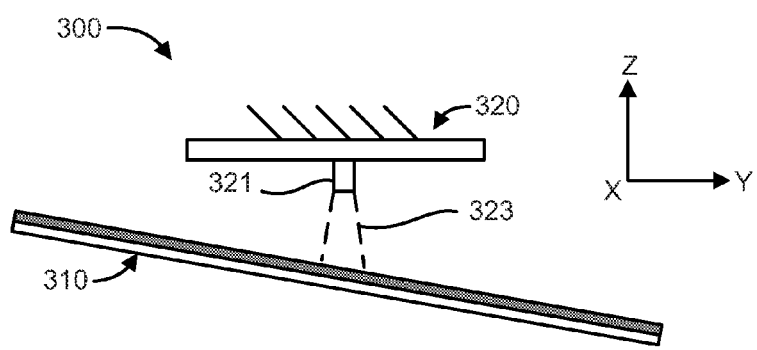
FIG. 10 is a side schematic view of a sensor in accordance with yet another embodiment of the present disclosure.

FIG. 10 illustrates a sensor in accordance with another example of the present disclosure. In this example, the sensor 300 comprises a light component 320 in support of a light source 321, which is mounted in a substantially normal orientation on the light component, and which is configured to emit a beam of light 323 onto an image sensor of an imaging device 310 initially supported in a manner such that it is oriented on an angle relative to the light component 320 (e.g., they are non-parallel to one another). In the configuration shown, the sensor 300 is capable of providing determinable translational measurements along the x and y axes, and determinable rotational measurements about the x and y axes. Translational and/or rotational measurements can be determinable in the event a conical and/or an oblong (or other similar shaped) beam of light is caused to be emitted onto the imaging device 310.

Figure 11:
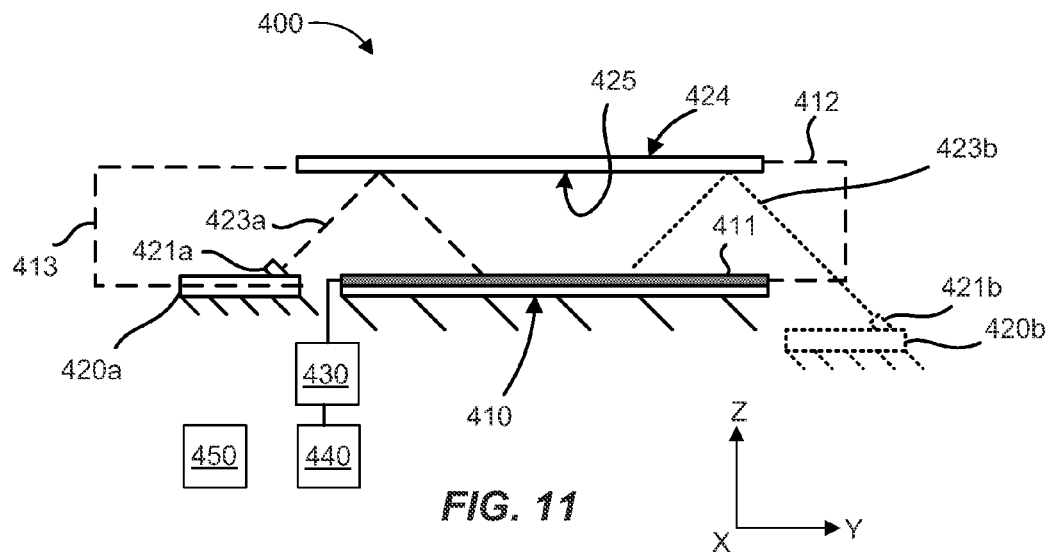
FIG. 11 is a side schematic view of a sensor in accordance with still another embodiment of the present disclosure.

With reference to FIG. 11, illustrated is a sensor 400 in accordance with another example of the present disclosure. The sensor 400 is similar in many respects to the other sensors described herein. As such, the description of the various components or elements of those sensors are incorporated herein as appropriate and as will be apparent to those skilled in the art. Unlike the sensor embodiments previously discussed, the sensor 400 comprises a light deflection module 424 positioned about an imaging device 410 having an image sensor 411. The light deflection module 424 can comprise a surface 425 configured to partially reflect, fully reflect or otherwise deflect light emitted onto it from a light source. In the example shown, the sensor can further comprise a light component 420a in support of a light source 421a operative to emit a beam of light 423a onto the reflective surface 425 of the light deflection module 424. In one aspect, the light component 420a is located on a common side as the imaging device 410, and operates to support the light source 421a in such a manner so as to direct the beam of light 423a in a direction initially away from the imaging device 410 and toward the reflective surface 425 of the light deflecting module 424. It is noted that being located on a common side, the light source 421a and the imaging device 410 can both be powered from the same side in one example sensor configuration. Upon coming into contact with the reflective surface 425 of the light deflecting module 424, the reflective surface 425 operates to reflect, partially reflect or otherwise deflect the emitted light in a different direction, causing it to be emitted onto the image sensor 411 of the imaging device 410 as shown. The light component 420a and light source 421a are shown as being fixed relative to the imaging device 410. In addition, the light component 420a and the light deflecting module 424 can be configured to be moveable relative to one another, such that relative movement causes the emitted light to disperse across additional pixels as the movement of the imaging device 410 and the light component 420a deviate from an initial position. In one aspect, the light deflection module 424 can facilitate specular reflection and can comprise a planar surface 425 and can be positioned, initially, substantially parallel to the light component 420a, such that the angle of incidence in the beam of light 423a emitted from the light source 421a is the same as the angle of the reflected beam of light off of the surface 425 and onto the image sensor 411. In another aspect, the light deflection module 424 can facilitate specular reflection and can comprise a planar surface 425 and can be oriented such that two or more of the x-y-z axes of the light deflection module are non-parallel to the imaging device. In still another aspect, the light deflection module 424 can comprise a nonplanar surface (e.g., such as one having a rough surface, a surface with one or more irregularities, etc.) such that the angle of incidence of the emitted beam of light 423a on the nonplanar surface is different from the angle of reflection of the reflected beam of light as directed upon the image sensor 411.

The sensor 400 can further comprise a second light component 420b in support of a light source 421b operative to emit a beam of light 423b toward the light deflection module 424 and onto the reflective surface 425, wherein the beam of light is reflected onto the image sensor 411 of the imaging device 410. The second light component 420b and second light source 421b can be positioned about the imaging device 410 in a similar position and manner as the first light component 420a and first light source 421a (e.g., in substantially the same plane as the imaging device 410, on an opposing side of the imaging device 410, etc.), or it can be positioned in a different position (e.g., in a different plane than the first light component 420a). A second light component 420b can improve or enhance resolution of the sensor 400, depending upon how the sensor 400 is configured.

Similar to other sensors described herein, the sensor 400 can be configured to function as a sensor by virtue of the relative movement between the first light component 420a, the second light component 420b and the imaging device 410. In operation, relative movement between the imaging device 410 and the light deflecting module 424 can facilitate measurements in multiple degrees of freedom similar to other sensors discussed herein. In the embodiment shown, for example, relative translational movement can be determinable along the z axis as the angle of incidence and the angle of reflection change as the light deflecting module 424 moves toward and away from the imaging device 410. With the first light component 420a and the first light source 421a configured to direct a beam of light 423a onto the surface 425 of the light deflecting module 424 and subsequently onto the imaging device 410 and the image sensor 411 as reflected (or otherwise deflected) from the surface 425, and with the first light component 420a and first light source 421a fixed relative to the imaging device 410, relative translational movement between the imaging device 410 and the first light component 420a along the z axis is measureable and determinable. In this configuration, translational movement along the x and y axes is not measureable as the first light component 420a and the imaging device 410 and first light source 421a are fixed relative to one another, and movement by the first light component 420a along either of the x and y axes would not cause additional or other pixels on the image sensor 411 to be illuminated. Of course, it is contemplated that in another aspect, the sensor 400 can be configured such that the first light component 420a and the imaging device 410 are moveable relative to one another, which would provide determinable measurements from translational movement along each of the x, y and z axes.

With respect to rotational measurements within the sensor 400, in the situation where the first light component 420a and first light source 421a are fixed relative to the imaging device 410, relative rotational movement between these components about the x and y axes is determinable. Rotation about the z axis will likely not yield a determinable measurement in this situation as the rotation of the first light component 420a about the z axis will not cause the reflected beam of light 423a to emit across other pixels. However, in the configuration in which the first light component 420a and the imaging device 410 are moveable relative to one another, relative rotational movement about each of the x, y and z axes is measurable and determinable.

Although the first and second light components 420a and 420b (and their associated light sources) are shown as being fixed relative to the imaging device 410, this is not to be limiting in any way. Indeed, in some aspects, the sensor 400 can be configured such that one or both of the first and second light components 420a and 420b and the imaging device 410 are moveable relative to one another.

The sensor 400 can further be operative with a light location module 430, a position module 440 and a clock 450 in a similar manner as discussed above. Similarly, interrogation and function of the sensor 400 can be accomplished in a similar way as described elsewhere herein.

Figure 12:
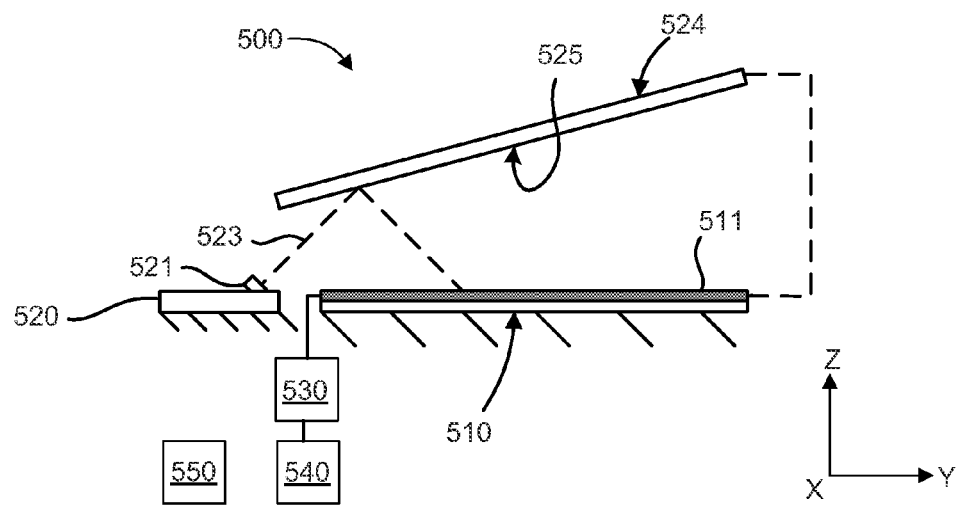
FIG. 12 is a side schematic view of a sensor in accordance with still another embodiment of the present disclosure.

With reference to FIG. 12, illustrated is a sensor 500 in accordance with another example of the present disclosure. The sensor 500 is similar in many respects to the sensor 400 discussed above, except that the light deflecting module 524 (which is shown as being planar) with its associated surface 525 is initially oriented on an incline relative to the image sensor 511 and the imaging device 510 about one of the x and y axes (in this case the x axis, as shown). In this embodiment, with the light component 520 fixed relative to the imaging device 510, relative translational movement between the light deflecting module 524 and the imaging device 510 is measurable and determinable along the y and z axes. Furthermore, relative rotational movement between the light deflecting module 524 and the imaging device 510 is measureable and determinable about each of the x, y and z axes. In essence, it is contemplated that the sensor 500 can be initially oriented such that at least two of the x-y-z axes of the light deflection module are non-parallel to the imaging device, thus facilitating the determination of the relative movement of the imaging device and the light deflection module in at least five degrees of freedom.

Figure 13:
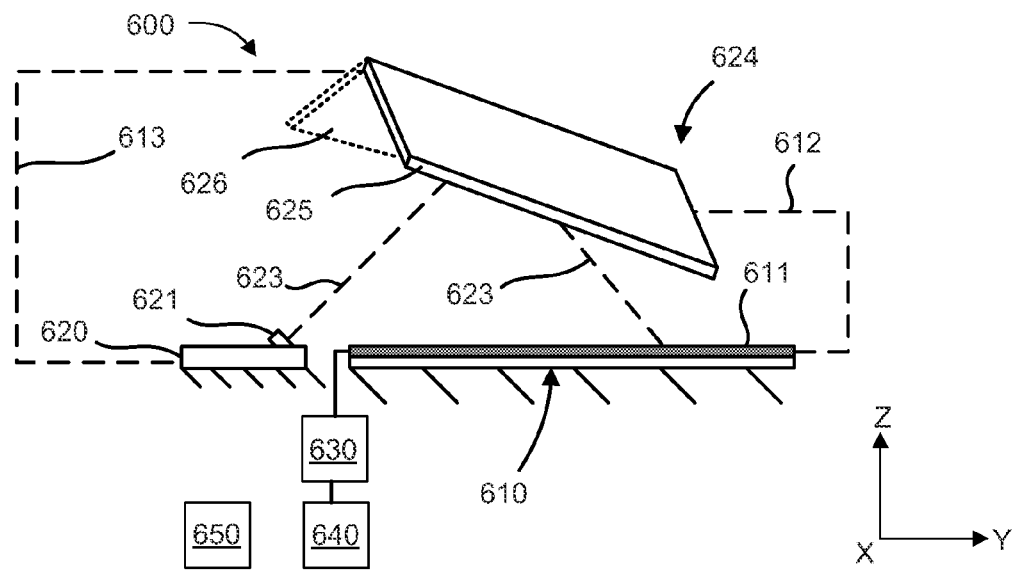
FIG. 13 is a side schematic view of a sensor in accordance with still another embodiment of the present disclosure.

With reference to FIG. 13, illustrated is a sensor 600 in accordance with another example of the present disclosure. The sensor 600 is similar in many respects to the sensors 400 and 500 discussed above, except that the light deflecting module 624 (which is shown as being planar) with its associated surface 625 is initially oriented on an incline relative to the image sensor 611 and the imaging device 610 about each of the x and y axes. In this embodiment, with the light component 620 fixed relative to the imaging device 610, relative translational movement between the light deflecting module 624 and the imaging device 610 is measurable and determinable along each of the x, y and z axes. Furthermore, relative rotational movement between the light deflecting module 624 and the imaging device 610 is measureable and determinable about each of the x, y and z axes. Here, it is contemplated that the sensor 600 can be oriented such that all three of the x-y-z axes of the light deflection module are non-parallel to the imaging device, wherein relative movement of the imaging device and the light deflection module is determinable in six degrees of freedom.

The sensor 600 can further comprise a light deflecting module comprising two surfaces 625 and 626 extending in or oriented in two different planes. In the example shown, the surface 625 can be offset from the surface 626 any desired or needed angle. Providing multiple surfaces can enhance the sensitivity of the sensor 600 by providing some relative movements between the imaging device and the light deflecting module 624 that are measurable at a faster rate and/or with more accuracy. For example, a change in the angle of reflection is likely to occur much faster and at a much larger degree if the beam of light 623 travels across both of surfaces 625 and 626 during a measurable relative displacement or movement within the sensor 600.

Figure 14:
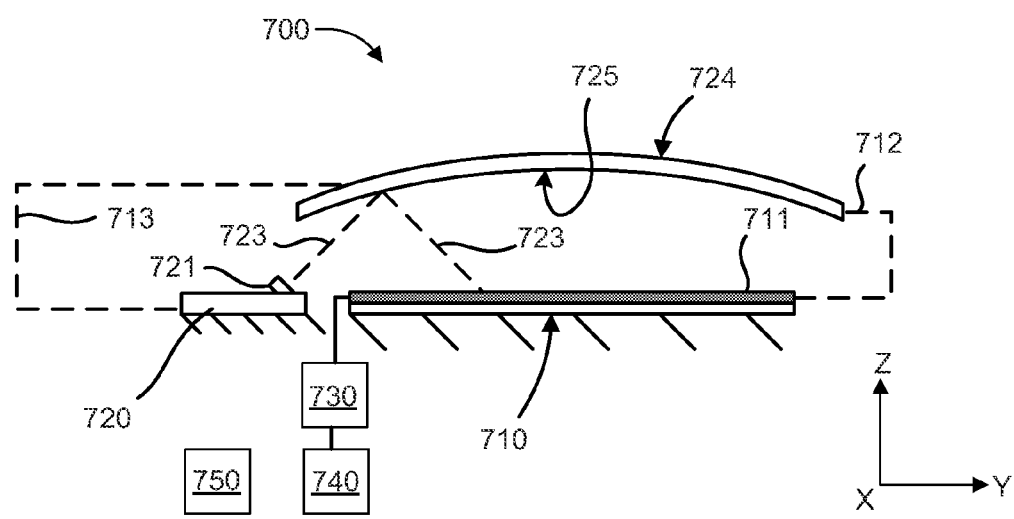
FIG. 14 is a side schematic view of a sensor in accordance with still another embodiment of the present disclosure.

The light deflecting module 624 can be operative with (e.g., coupled, joined to, adhered to, etc., such as via a coupling mechanism, device, system 612) to the imaging device 610 in a manner so as to facilitate relative movement between the two as discussed herein. Likewise, the light component 620 can be operative with (e.g., coupled to, joined to, adhered to, etc., such as via a coupling mechanism, device, system 613) the light deflecting module 624 so as to facilitate relative movement between the two as discussed herein. Alternatively, the light component 620 can be operative with the imaging device 610 in a similar manner. Furthermore, the sensor 600 can be operative with a light location module 630, a position module 640 and a clock 650 in a similar manner as discussed above. Similarly, interrogation and function of the sensor 600 can be accomplished in a similar way as described herein With reference to FIG. 14, illustrated is a sensor 700 in accordance with another example of the present disclosure. The sensor 700 is similar in many respects to the sensors 400, 500 and 600 discussed above in that the sensor 700 comprises a light deflecting module 724 operative to deflect (e.g., reflect) light 723 emitted from the light source 721 supported by the light component 720 toward the imaging device 710 and onto the image sensor 711. However, in this example, the light deflecting module 724 is non-planar and comprises a corresponding surface 725. In this example, the light deflecting module 724 and the surface 725 are shown as having a curved configuration. The surface 725 can be curved in multiple directions, such as comprising a partial arcuate or partial spherical shape. It is noted that the curved light deflecting module 724 shown in the drawings is intended to be representative of one example embodiment. Indeed, those skilled in the art will recognize other configurations that are possible. With the light deflecting module 724 comprising a curved configuration, relative movement between the imaging device 710 and the light deflecting module 724 is measurable and determinable within six degrees of freedom (three translational degrees of freedom along the x, y and z axes, and three rotational degrees of freedom about the x, y and z axes). Indeed, relative movement between these components will cause the beam of light 723 to disperse across additional or other pixels as compared to those receiving light initially.

It is noted that one advantage of providing a light source on a common or same side as the imaging device, and being able to deflect or reflect this light off of a light deflecting module onto the image sensor 711, is that power can be supplied to the sensor and all of its components in need of power (i.e., the light source, the imaging device) from the same side.

The light deflecting module 724 can be operative with (e.g., coupled, joined to, adhered to, etc., such as via a coupling mechanism, device, system 712) to the imaging device 710 in a manner so as to facilitate relative movement between the two as discussed herein. Likewise, the light component 720 can be operative with (e.g., coupled to, joined to, adhered to, etc., such as via a coupling mechanism, device, system 713) the light deflecting module 724 so as to facilitate relative movement between the two as discussed herein. Alternatively, the light component 720 can be operative with the imaging device 710 in a similar manner. Furthermore, the sensor 700 can be operative with a light location module 730, a position module 740 and a clock 750 in a similar manner as discussed above. Similarly, interrogation and function of the sensor 700 can be accomplished in a similar way as described herein.

Figure 15:
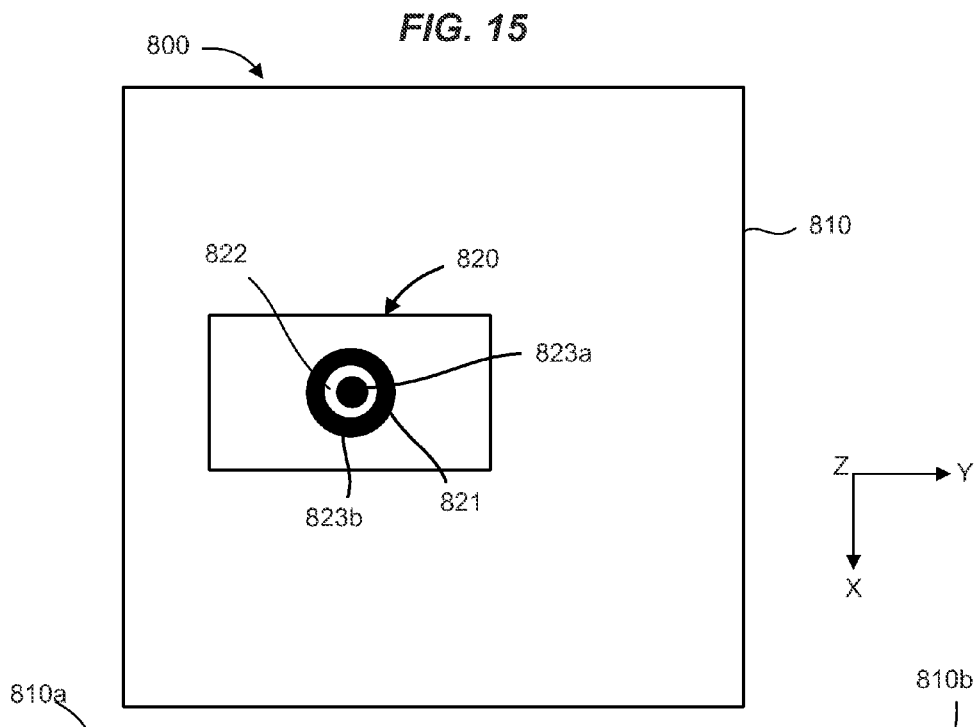
FIG. 15 illustrates a top schematic view of a sensor in accordance with another embodiment of the present disclosure.

FIG. 15 illustrate a sensor in accordance with another example of the present disclosure. In this example, the sensor 800 can be formed and can be caused to function similar to the other sensor examples discussed herein. For example, the sensor 800 can comprise one or more light components in support of at least one light source operable to emit one or more beams of light; an imaging device 810 operable to receive the beams of light, and to convert these into at least one electric signal; a light location module configured to receive the at least one electric signal and determine the locations of the one or more beams of light on the imaging device; and a position module configured to determine a relative position of the imaging device and the light component based on the locations of the one or more beams of light on the imaging device 810.

However, sensor 800 can comprise multiple beams of light, with one or more of these beams of light formed having a ring or ring-like configuration, and one or more comprising a central beam of light. Moreover, the multiple beams of light can be configured such that there comprises unlit or "dark" areas or areas of reduced illumination adjacent and/or between the beams of light, thus providing the beams of light with at least one edge. For example, in the embodiment shown, the sensor comprises two beams of light from one or multiple light sources. The first beam of light 823*a* comprises a central beam of light. Formed in a ring around the central first beam of light 823*a* is a second beam of light 823*b*. The at least two edges of the beam of light 823*b* at the imaging device can define outer and inner perimeters of an annular ring, wherein an area of reduced illumination can be adjacent the annular ring. Indeed, the second beam of light 823*b* can be separated from the first beam of light 823*a* by an area of reduced illumination 822 (an area about the imaging device that is unlit (or dark) or partially unlit (or dark)), which in this case also comprises an annular ring configuration surrounding the central first beam of light 823*a*.

The first and second beams of light 823*a* and 823*b* can be spaced at any distance. Moreover, the second beam of light 823*b* and the area of reduced illumination 822 can comprise the same or different widths within themselves, and relative to one another. They can even comprise color to help in distinguishing them or certain characteristics of them.

The first and second beams of light 823*a* and 823*b* can be generated and emitted by any light component/light source number, type, etc. discussed herein, and that would be apparent to those skilled in the art. In one aspect, the beams of light 823*a* and 823*b* can be generated by a single light source, such as light source 821, operative with a lens or lens system configured to provide a sequential pattern or array of a central first beam of light, an area of reduced illumination, and a ring or surrounding second beam of light. The lens can be configured to generate any desired pattern, shape, sequence, etc. of light in accordance with the discussion herein. The light source can be configured to direct a series of beams of light onto the imaging device, with each beam of light at the imaging device having at least two edges.

In another aspect, the beams of light 823*a* and 823*b* can be generated by a single light source, such as light source 821, operative with an optical blocker configured to provide or generate the annular beams of light and adjacent areas of reduced illumination. In still another aspect, multiple light sources can be used to generate the various beams of light and areas of reduced illumination. Still other devices and systems and methods may be available to generate the various beams of light and adjacent areas of reduced illumination as will be apparent to those skilled in the art.

It is noted that any type of light component/light source discussed herein can be utilized in the sensor to create the light rings. In addition, those skilled in the art will recognize that the rings do not have to be circular or annular, but that they can comprise any configuration or shape. Moreover, the light distribution across the imaging device can comprise any sequence or pattern of both lit and non-lit areas, wherein the non-lit areas may comprise dark areas or areas of reduced illumination (e.g., adjacent the annular rings). The light sources can further be configured to emit light at a given color frequency.

Providing the sensor with and configuring the beams of light in this type of configuration functions to increase the number of edges of the beams of light, which improves the resolution of the sensor. Resolution is increased as additional distributions of light between edges are made available for interrogation along different axes of movement. In addition, the edges can provide a highly discernible location for the presence or non-presence of light, and thus leading to increased statistical robustness in the post-processing steps.

Figure 16A:
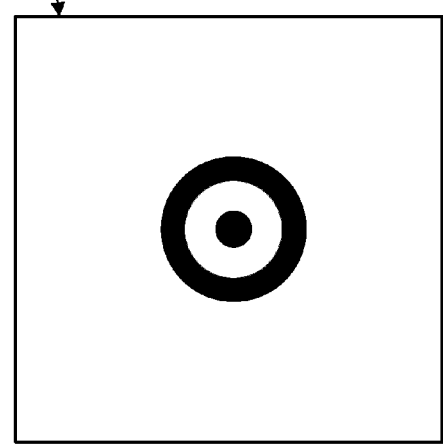
FIGS. 16A and 16B illustrate representations of light emissions as applied to the imaging device from a light source within a sensor in accordance with one example of the present disclosure.

FIG. 16A illustrates a representation of one exemplary pattern of annular beams of light and adjacent areas of reduced illumination (surrounding a central beam of light). In this example, a central beam of light is surrounded by an annular area of reduced illumination, which is surrounded by an annular beam of light. This light/reduced light or dark pattern can repeat as often as needed or required across the imaging device 810*a* to provide or define several edges.

Figure 16B:
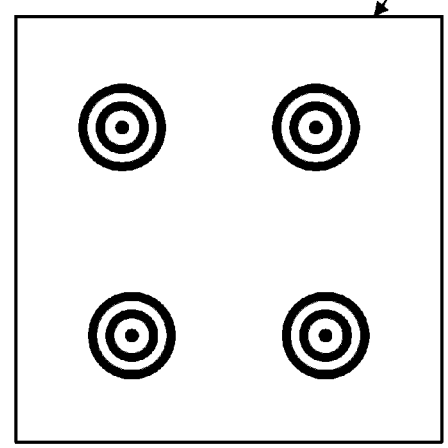

FIG. 16B illustrates a representation of a light emission pattern based on light generated from multiple light sources, each one comprising a pattern of annular beams of light and adjacent areas of reduced illumination (surrounding a central beam of light). In this example, there are a total of four different light/reduced light or dark patterns distributed across the imaging device 810*b*, each one with a plurality of edges.

Figure 16C:
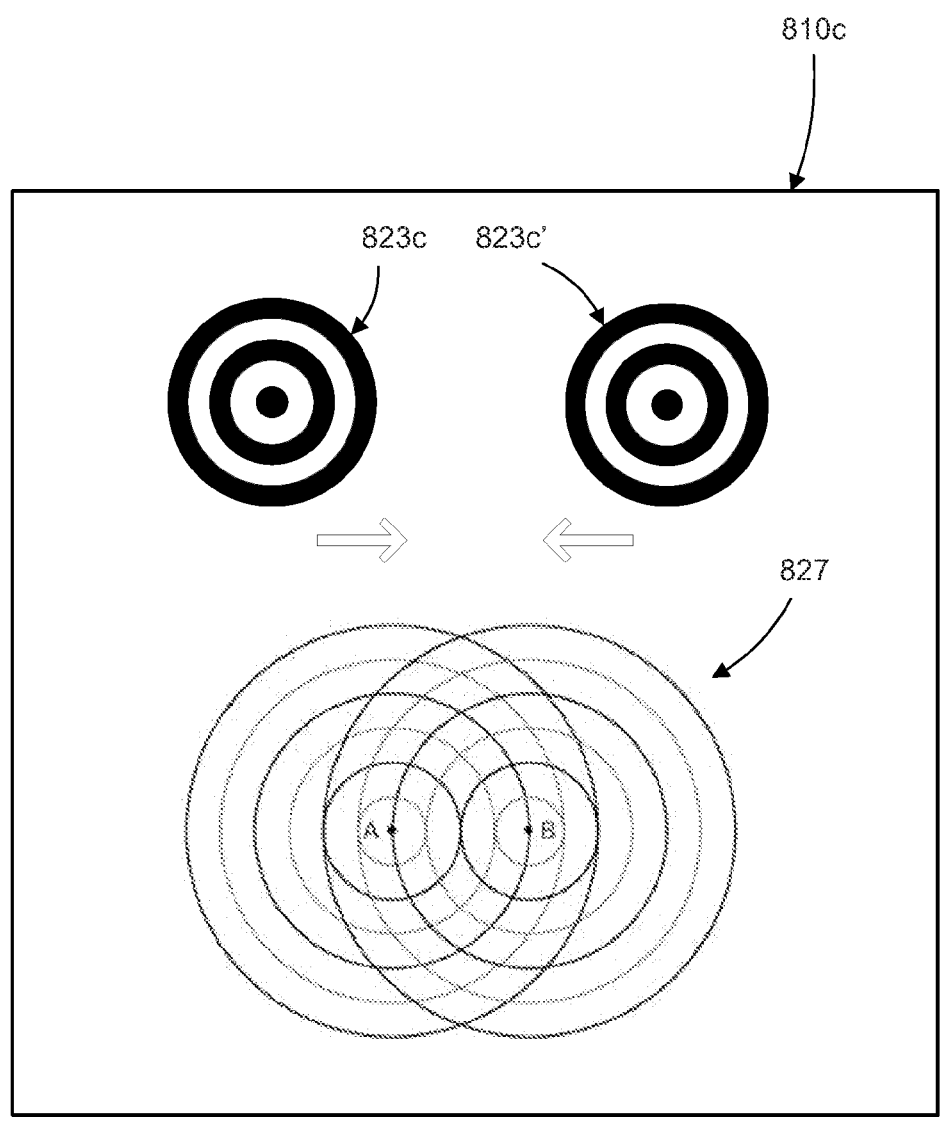
FIG. 16C illustrates a graphical representation of a light emission having an interference wave pattern about the imaging device resulting from impinging beams of light from two or more light sources.

The present disclosure further describes a sensor configured to provide light emitted by two or more light sources in accordance with yet another example. Again, the sensor can be formed and can be caused to function similar to the other sensor examples discussed herein. For example, the sensor can comprise one or more light components in support of, in this case, at least two light sources operable to emit respective beams of light; an imaging device operable to receive the beams of light, and to convert these into at least one electric signal; a light location module configured to receive the at least one electric signal and determine the locations of the one or more beams of light on the imaging device; and a position module configured to determine a relative position of the imaging device and the light component based on the locations of the one or more beams of light on the imaging device. However, unlike the sensors discussed above, the sensor can comprise a plurality of light sources supported by one or more light components operative to generate the beams of light, such that these interfere with one another to create a plurality of light (where light is dispersed) and reduced light (where a reduced amount or no light is dispersed) areas about the imaging device. More specifically, at least some of the plurality of light sources can be configured to emit light at the same or different frequencies. The light sources can be configured and/or oriented such that their light emissions (or waves) impinge one another, such that a cumulative, interference light emission having a plurality of edges is caused to be received on or at the imaging device. Upon generating an interference light emission, one or more identifiable resultant superposed light wave front patterns (with edge detail forming various light areas and areas of reduced illumination adjacent one another) will emerge or be present on the imaging device having constructive and/or destructive wave properties. FIG. 16C illustrates a representation of this, wherein two light sources generate two individual light emissions 823*c* and 823*c*' that are shown as impinging one another, thus resulting in a cumulative interference light emission 827 having constructive wave forms or a constructive wave pattern about the imaging device 810*c*. The interference light emission and the resultant wave front patterns can provide a large number of light distributions available for detection and interrogation by the light location module and the position module operable with the sensor and sensor system due to the interference light emission present on the imaging device. In one example, the sensor can be configured such that the interference light emission comprises a plurality of light distributions, wherein the number of light distributions is greater in number than the number of light sources used to generate the beams of light. This increase in available light distributions can function to increase the resolution of the sensor over other sensors discussed herein. Relative movement between the imaging device and the light components (or the light deflecting modules) will cause the interference light emission to disperse across a larger number of different pixels of the imaging device. Which movement will result in signals and data to be identified and interrogated in a similar manner as with other sensors discussed herein, except that in this embodiment, there are several more light distributions. It is further noted that the light sources can emit light of the same or different color as well, thus providing still additional data for processing.

It is noted herein that each of the various light sources discussed above in the various embodiments and examples can be oriented in a variety of ways and directions. For example, angled light sources (relative to the imaging device) can be oriented to direct light beams in planes parallel to degree of freedom axes.

It is also noted that the number, location and placement, orientation, type, etc. of the light components and the light sources relative to the imaging device can be whatever is needed or desired to ensure that no relative movement of the imaging device and light component can "trick" the sensor into a faulty or incorrect reading and to achieve a desired result, such as redundancy or level of resolution. Those shown in the figures are merely exemplary, and are not intended to be limiting in any way. For example, light sources can be placed so as to emit light onto periphery portions, inner portions of the image sensor of the imaging device, or a combination of these. In one aspect, the number placement and type of light sources utilized can be configured to maximize the "sweep" of the light across the imaging device during relative movement of the light components and the imaging device within the sensor. Light sources can also be arranged in groups or patterns to provide different patterns or clusters of light onto the imaging device. Furthermore, colored light sources and a color separation mechanism can also be employed to fit an increased number of light sources into a small area without degrading the performance of the sensor.

Figure 17:
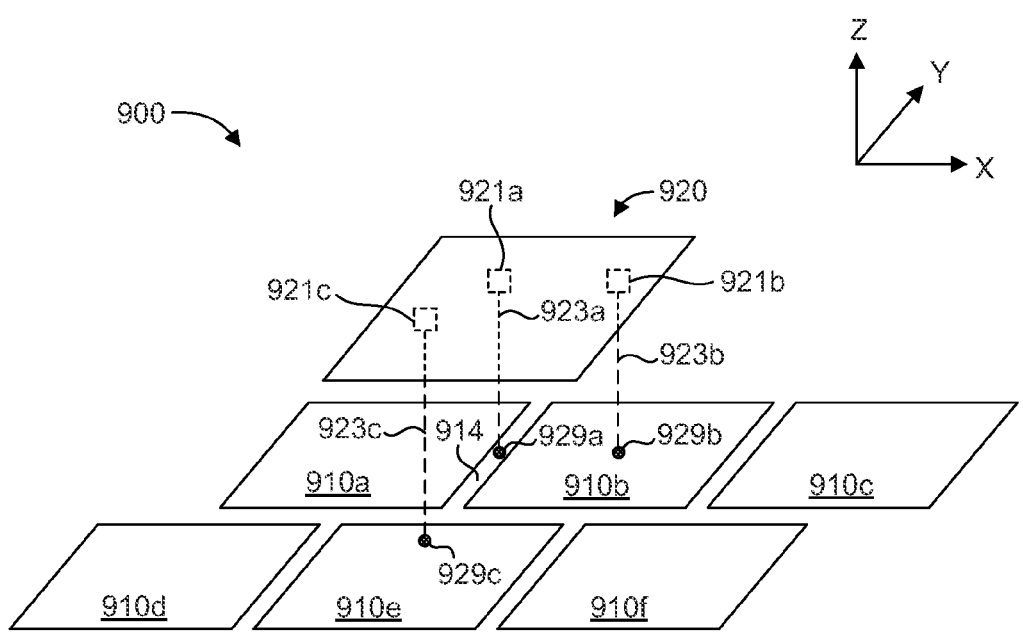
FIG. 17 a schematic of a plurality of sensors configured to work together to expand the capabilities beyond a single sensor.

FIG. 17 illustrates another embodiment of a sensor 900 that can include multiple light sources 921*a-c* as well as multiple imaging devices 910*a-f* disposed adjacent to one another to provide continuous measurement over a larger range of motion that may not available using only a single imaging device. For example, the sensor 900 can include any of the features and elements described hereinabove, such as a light component 920 in support of the light sources 921*a-c* (which may be perpendicular and/or angled) that direct light beams 923*a-c*, respectively, toward one or more of the imaging devices 910*a-f* or a light deflecting module at a given time. As shown, the imaging devices 910*a-f* are arranged in a staggered configuration with a region 914 in between imaging devices where no image sensor is present, such as at an interface between adjacent imaging devices. A light beam 923*a* may terminate at a location 929*a* that is in the region 914 between adjacent imaging devices 910*a*, 910*b*, in which case the light beam 923*a* will not contribute to the position determining functionality of the sensor 900. However, in this case, light beams 923*b*, 923*c* can terminate at locations 929*b*, 929*c* on imaging devices 910*b*, 910*e*, respectively, to contribute to the position determining functionality of the sensor 900 even when the light beam 923*a* cannot. In other words, the other imaging devices 910*b*, 910*e* still receiving light beams 923*b*, 923*c*, respectively, can compensate for the loss of signal from any given light source, such as 921*a*. In one aspect, the number and/or arrangement of imaging devices and/or light sources can be configured to ensure that at least one light source will terminate on an imaging device throughout a desired range of motion of the sensor and in any degree of freedom of the sensor Thus, in this way, multiple light sources can be used to ensure that the sensor 900 is operable to determine relative position of the light component 920 and the imaging devices 910*a-f* even when a light source is directing a beam of light to an area that is without an image sensor.

Figure 18A:
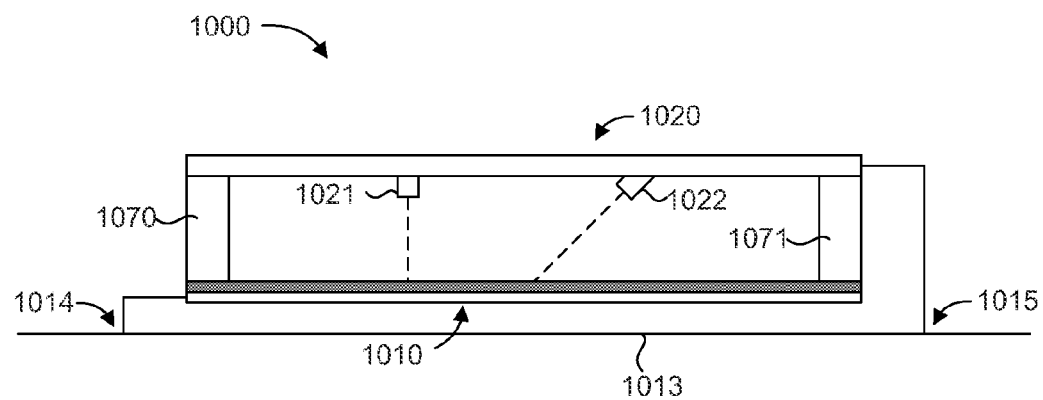
FIGS. 18A-18D illustrate various examples of systems and methods wherein the sensor technology discussed herein can be applied.
Figure 18B:
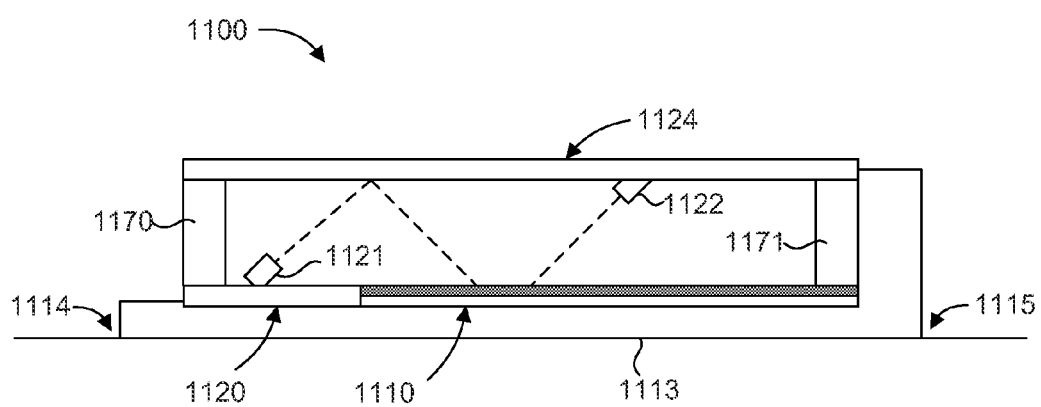

With reference to FIGS. 18A and 18B, illustrated are two additional exemplary sensors in accordance with the present disclosure. For example, FIG. 18A illustrates a sensor 1000 having an elastic member 1070, 1071 coupled to the imaging device 1010 and the light component 1020 to facilitate relative movement of the imaging device 1010 and the light component 1020. The elastic member 1070, 1071 can establish a nominal relative position for the imaging device 1010 and the light component 1020 and can facilitate relative movement of the imaging device 1010 and the light component 1020 in any suitable degree of freedom. The elastic member 1070, 1071 can comprise a spring, which can be configured as any suitable metal spring or as an elastomeric spring. Thus, in one aspect, the elastic member 1070, 1071 can act as a polymer suspension system for the imaging device 1010 and the light component 1020.

In one aspect, the elastic member 1070, 1071 can be disposed outboard of the light sources 1021, 1022. In another aspect, the elastic member can comprise a transparent layer disposed between the imaging device 1010 and the light component 1020. In one embodiment, the elastic member can comprise a silicone layer that acts as a separator between the imaging device 1010 and the light component 1020, which may provide a low displacement and high resolution sensor. In one aspect, the range of motion for the sensor 1000 can be limited by the size of the imaging device 1010 and the type of suspension or separation structure, which can depend on the magnitude of the desired range of motion and/or the application of the particular sensor.

For example, one application for the sensor 1000 can be as a strain gage. In this case, the imaging device 1010 can be anchored to a surface 1013 at location 1014 and the light component can be anchored to the surface 1013 at location 1015. As the surface 1013 experiences strain, the imaging device 1010 and the light component 1020 will move relative to one another, which movement can serve to facilitate measurement of the strain in one or more degrees of freedom.

In a similar alternative sensor design, illustrated in FIG. 18B, the 1100 can comprise a light deflecting module 1124 designed to reflect light off of its surface onto the imaging device 1110. The sensor 1110 can further comprise a light component 1120 positioned on a common side as the imaging device 1110, wherein the light component 1120 supports a light source 1121 configured to direct a beam of light toward the light deflecting module 1124 for subsequent reflecting of the beam of light onto the imaging device 1110. The light component 1120 can be located in the same plane as the imaging device 1110, and coupled to the elastic member 1170 and the imaging device 1110. The elastic member 1171 can be coupled to the imaging device 1110 as previously discussed. FIG. 18B illustrates a light source 1122 supported about the light deflecting module 1124. In an alternative design, the light reflecting module 1124 could be replaced with a light component as shown in FIG. 18A, wherein the light component is modified with a reflective surface (e.g., a coating) to facilitate reflection of the beam of light from the light source 1121. Similar to the sensor 1000 discussed above, the light component 1120 (and indirectly the imaging device 1110) of the sensor 1100 can be anchored to a surface 1113 at location 1114 and the light deflecting module 1124 can be anchored to the surface 1113 at location 1115. It will be recognized by those skilled in the art that a strain gauge is merely one example type of sensor made possible by the technology discussed herein. As such, this particular application is not intended to be limiting in any way.

Figure 18C:
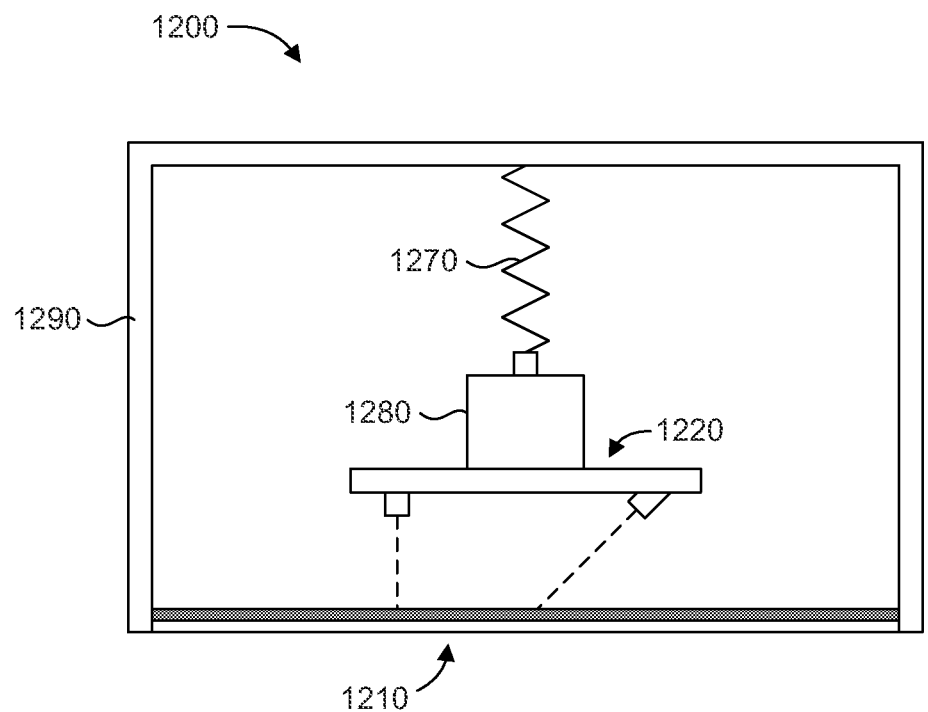
Figure 18D:
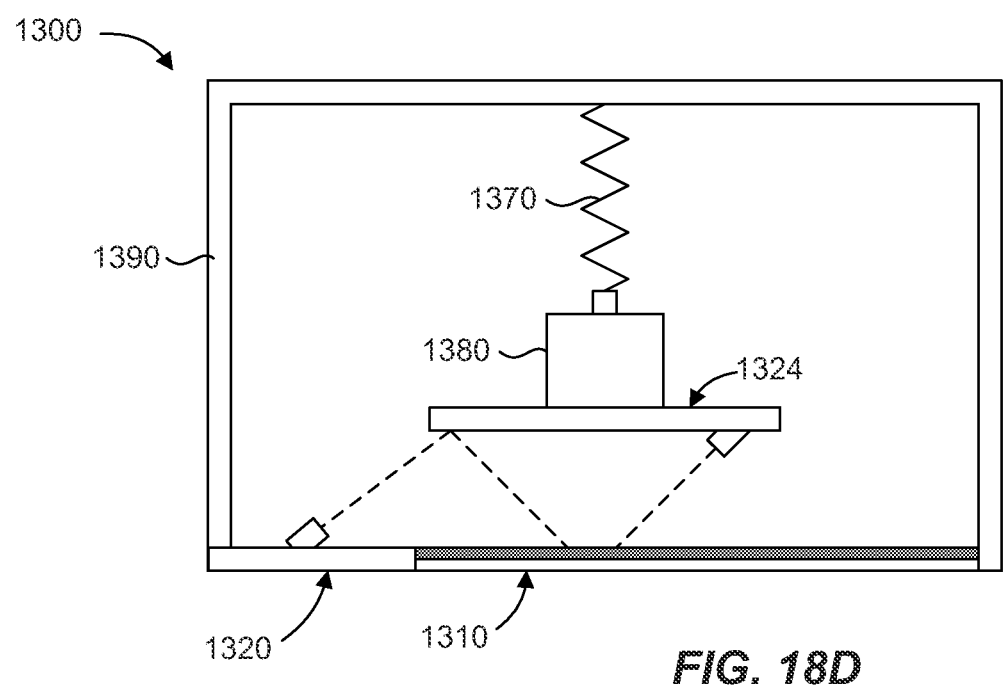

FIG. 18C illustrates another example of a sensor 1200 having a mass 1280 associated with the light component 1220, which can enable the sensor 1200 to measure acceleration and/or function as a navigation aid. The mass 1280 and the light component 1220 can be supported by an elastic member 1270, such as a spring, to facilitate relative movement of the imaging device 1210 and the light component 1220 in one or more degrees of freedom. In one aspect, the elastic member 1270 can be coupled to a support structure 1290, which can be coupled to the imaging device 1210. Although the light component 1220 is shown in the figure as being associated with the mass 1280 and suspended by the elastic member 1270, it should be recognized that the imaging device 1210 can be associated with the mass 1280 and suspended by the elastic member 1270. Alternatively, as shown in FIG. 18D, a light deflecting module 1324 can be associated with the mass 1380 and elastic member 1370, and the light component 1320 in support of a light source can be located on a common side with the imaging device 1310. The elastic member 1370 can be coupled to the support structure 1390, which can be coupled to the light component 1320 (and indirectly to the imaging device 1310).

In another example of a sensor (not shown), a whisker can be coupled to an imaging device or a light component and placed in a flow field to determine boundary layer thickness. In yet another example of a sensor (not shown), an imaging sensor and a light component can be configured for continuous relative rotation to measure rotary position.

Figure 19A:
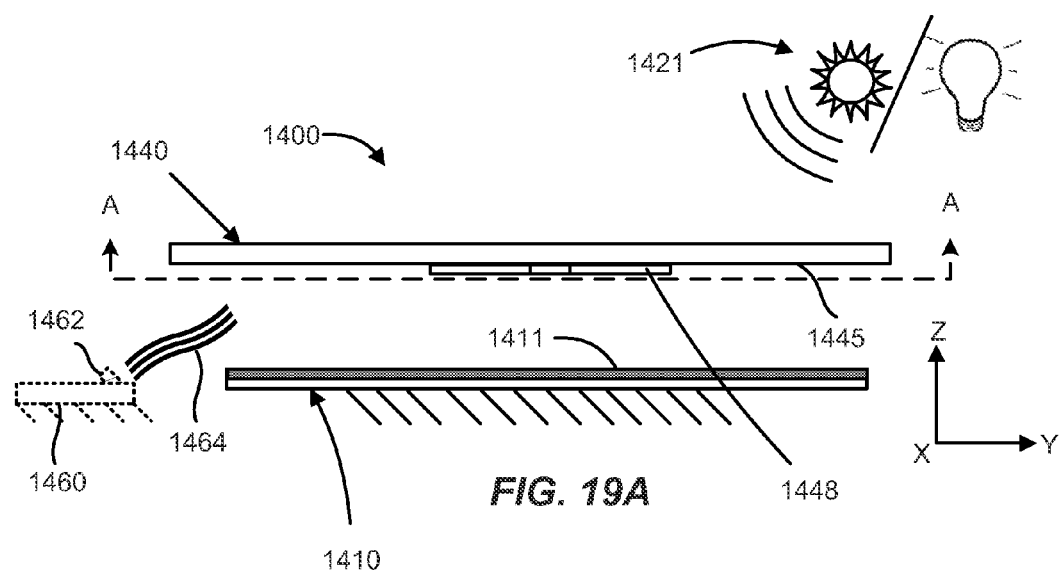
FIG. 19A illustrates a side schematic view of a sensor in accordance with another example of the present disclosure.
Figure 19B:
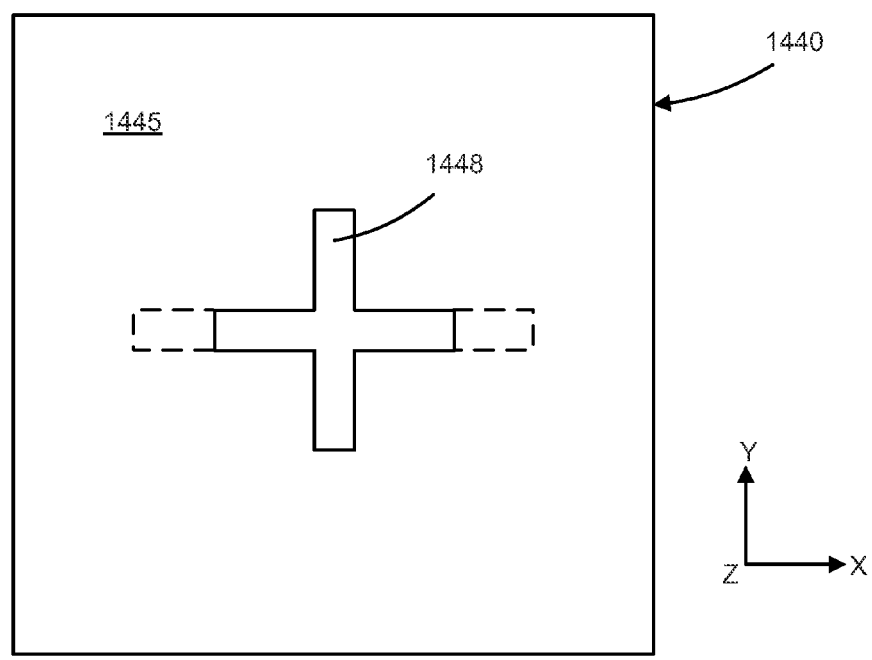
FIG. 19B illustrates a bottom view of the sensor of FIG. 19A taken along section A-A, representing a fiduciary in accordance with one example.

With reference to FIGS. 19A and 19B, illustrated is a sensor in accordance with another example of the present disclosure. The sensor 1400 comprises an imaging device 1410 having an image sensor 1411 and a support structure 1440, wherein the imaging device is positioned proximate the support structure 1440. The support structure 1440 and the imaging device can be moveable relative to one another in one or more degrees of freedom (e.g., translational and/or rotational degrees of freedom as discussed herein with other sensors). The sensor further comprises a fiduciary 1448 disposed about the support structure 1440, in this example about the surface 1445 of the support structure 1440. The fiduciary 1448 can comprise anything that can be identified by the imaging device 1410, wherein a characteristic or aspect of the fiduciary (e.g., all or part of a size of the fiduciary, a position of the fiduciary relative to the imaging device, a color of the fiduciary, an intensity of the fiduciary, etc.) is determinable upon the relative movement of the imaging device 1410 and the fiduciary 1448, one or more of these characteristics or aspects effectively changing due to the relative movement. In the example shown, the fiduciary comprises an object having a cross shape that is supported on the support structure 1440, and that comprises identifiable dimensions operative to provide or facilitate an image detectable by the imaging device 1410. The sensor 1400 can be operable within ambient light conditions, meaning that it is somewhat different from other sensors discussed herein that describe and utilize a beam of light that is used for measurements that is caused to be emitted from a light source dedicated for that purpose. Here, in this example, the sensor 1400 is operable in ambient light (light that is dispersive and not necessarily directional in nature or supplied specifically for the purpose of facilitating operation of the sensor), wherein the ambient light illuminates the fiduciary such that the fiduciary is viewable by the imaging device under the ambient light. The ambient light 1421 can comprise natural light (e.g., the sun) or artificial light (powered light). Although the ambient light 1421 is shown in the example of FIG. 19A as being above the imaging device, this is not to be limiting in any way. The source of the ambient light can be located anywhere relative to the sensor. The intensity of the ambient light should be such that the fiduciary 1448 and the associated image indicia are detectable.

The image that is detected or seen by the imaging device 1410, as based on the presence of the fiduciary 1448, can have some image indicia, such as a patter or spectra or levels of contrast or brightness, whether for one or more colors (or black or white), intensities of one or more colors (or black or white) and/or whether in one or both dimensions of the imaging device 1410 (i.e., X or Y, or some or all of X+Y). At any given starting point of the fiduciary 1448 relative to the imaging device 1410, that starting point can be made the "zero" and then used as the reference for determining the relative movement of the imaging device 1410 and the support structure 1440, and the fiduciary 1448. In determining a measurement, the end point of the fiduciary 1448 can be compared to the starting point and the distance the fiduciary 1448 traveled about the imaging device 1410 can provide a measurement. For example, the starting point or "zero" can be known. Upon relative movement between the imaging device 1410 and the support structure and the fiduciary 1448, the second or end point of the fiduciary 1448 relative to the imaging device 1410 will be offset from the starting point. Based on the distance and direction traveled by the fiduciary, or the change in position, various measurements can be determined to facilitate operation of the sensor as intended. In short, a starting image with its image fiduciaries can be compared to a subsequent image with its image fiduciaries and these compared to obtain the desired measurements.

In one aspect, one or more characteristics or aspects of the fiduciary 1448 can be known beforehand. For example, the various dimensions of the fiduciary 1448 can be known and stored in a memory operative with the position module and wherein a change in size of the fiduciary 1448 is determinable upon relative movement of the support structure 1440 and the imaging device 1410 in a given degree of freedom, and comparison of the change in size of the fiduciary 1448 to the actual size of the fiduciary 1440 provides a determinable degree of relative movement between the support structure 1440 and the imaging device 1410.

In another aspect, a dimension of the fiduciary 1448 along a first axis can be different than a dimension of the fiduciary 1448 along a second axis (see dotted lines in FIG. 17 where in one example the length of the fiduciary along the X axis can be greater than the length of the fiduciary along the Y axis), thus facilitating measurements about a z-axis upon relative movement of the support structure 1440 and the imaging device 1410.

Up to three translational degrees of freedom along the X, Y and Z axes can be obtained and up to three rotational degrees of freedom about the X, Y and Z axes can be obtained by comparing the position of the fiduciary 1448 relative to the imaging device 1410. For example, translation along the X and Y axes can be obtained by measuring the change in position of the fiduciary relative to the imaging device 1410. The path of travel can also be identifiable and determinable. Translation in the Z direction can be determined and detectable as there will be a change in the overall size of the fiduciary 1418 relative to the imaging device. Similarly, rotational degrees of freedom about the X and Y axes can be obtained by comparing the size of the fiduciary (or portions thereof. Indeed, certain sides of the fiduciary 1448 will appear larger or smaller depending upon the direction of rotation from the starting point to the ending point. Rotation in the Z axis can be determined by measuring the change in position (or identifying and determining the path traveled) of the fiduciary 1448.

In one aspect, the range of the useful measurement can be limited by the size of the image sensor 1411. However, in another aspect, if the update rate is sufficient with respect to the relative movement speed, then up to the entire imaging device (or the image sensor 1411) can be used as the sensing element. This will provide extremely high resolution, as well as provide, in some instances, a sensor with a range of motion that is limited only by the continuity of the surface it is on (i.e., the given location and associated "pattern" can be the reference image for a subsequent displacement measurement). In short, the signal generated by the imaging device 1410 can be based substantially on the fiduciary 1448 and the image it facilitates (it is noted that there may be some portion of the signal generated from incremental motion at the edges). This signal can then be processed in a similar manner as discussed herein.

Although a single fiduciary 1448 is shown in the example of FIGS. 19A and 19B, it is contemplated that a plurality of fiduciaries can be used within a single sensor to provide more complex or unique image indicia identifiable by the imaging device. The fiduciaries can be the same or different in their type, characteristics, etc. as will be apparent to those skilled in the art.

In another aspect, the sensor can comprise a fiduciary capable of luminescing or one being caused to luminesce, wherein light emitted by the fiduciary 1448 is caused to be received on the imaging device, such that the fiduciary 1448 effectively functions in a similar manner as the dedicated light sources discussed above with respect to the other sensor embodiments, and wherein relative movement within the sensor in one or more degrees of freedom is determinable based on the light emitted by the fiduciary 1448 caused to disperse across different pixels of the imaging device 1410. In one example embodiment, the sensor 1400 can further comprise a light source 1462 supported by a light component 1460, wherein the light source 1462 is operative to generate and direct a beam of light 1464 onto the fiduciary 1448 capable of causing the fiduciary 1448 to emit light, such that the resulting emission is detectable by the imaging device 1410 for the purpose of determining relative movement between the imaging device 1410 and the support structure 1440 and the fiduciary 1448 thereon in one or more degrees of freedom. In this example, the fiduciary 1448 can be excitable. In one example, the fiduciary 1448 can comprise a fluorescent, wherein the light source 1462 operative within the sensor 1400 directs a beam of light (e.g., UV light) toward and onto the fiduciary 1448 causing the fiduciary 1448 to fluoresce and emit light detectable by the imaging device 1410. The fiduciary 1448 can be formed of a fluorescing material, or it can comprise a fluorescing coating. The light source 1462 can be located about a side of the sensor 1400 common with the imaging device 1410, such that the light source 1462 and the imaging device 1410 can be powered from the same common side. In one aspect, the structure in support of the light source 1462 can comprise the same structure supporting the imaging device 1410. In another aspect, these can comprise different structures.

In one aspect of the technology described herein, the light source 1462 can comprise a UV light operative to propagate light at a wavelength ranging from approximately 315 to 400 nanometers. In another aspect, the light source 1462 can emit UV light at wavelengths in the mid (290-315 nm) or far (190-290 nm) UV fields.

Other types of luminescence methods and systems are contemplated for use on or with the fiduciary, such as phosphorescence, and chemiluminescence.

Figure 19C:
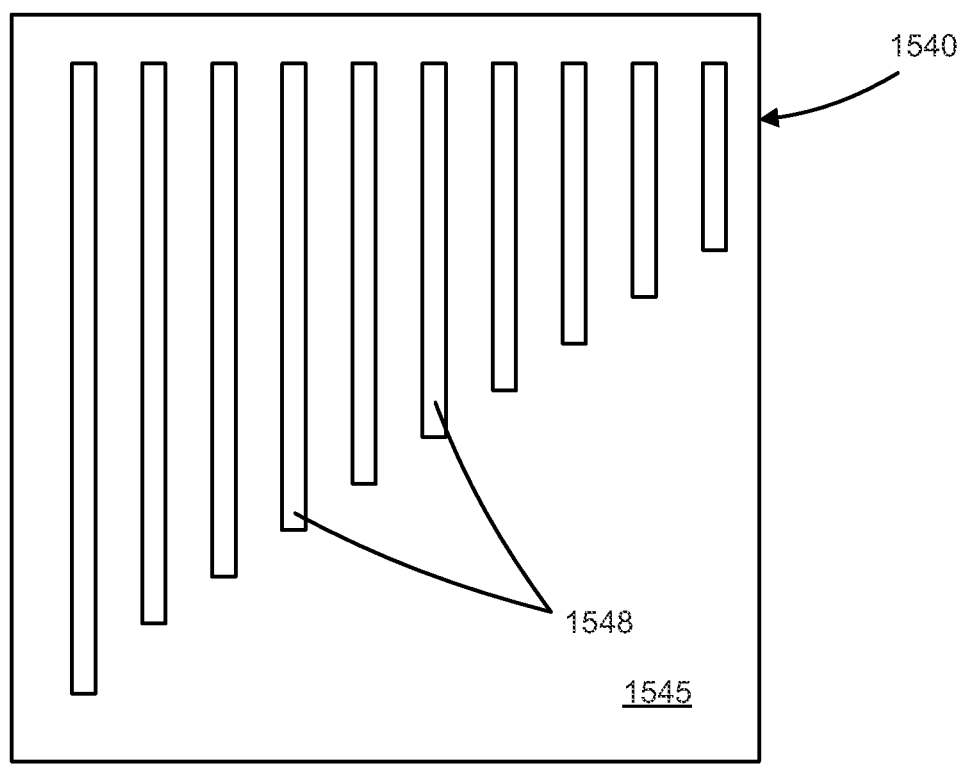
FIG. 19C illustrates a bottom view of the sensor of FIG. 19A taken along section A-A, representing a fiduciary in accordance with another example.

FIG. 19C illustrates an alternative example of a fiduciary operable within the sensor 1400, wherein the fiduciary comprises a plurality of fiduciaries 1548 in the form of bars disposed about the surface 1545 of the support structure 1540 in a specific pattern. In one aspect, the fiduciaries 1548 can each comprise a different dimension, such that each of the different fiduciaries 1448 (and the image indicia formed by these) are individually identifiable by the imaging device 1410. In another aspect, a characteristic or aspect about all or a certain collection of the fiduciaries 1448 can also be identified and used in the measurements. For example, in the example shown, the slope of a line defined by the terminal ends of the various fiduciaries 1448 can be known and tracked. Knowing the characteristics or aspects of each individual fiduciary 1448 (or the characteristics or aspects of all or a collection of fiduciaries) being used facilitates comparison of each fiduciary 1448 as a result of relative movement between them and the imaging device 1410, similar to how comparison and measurement of a single fiduciary is achieved as discussed above.

Again, the sensor 1400 can further comprise a position module and any other components for facilitating functionality in a similar manner as discussed herein.

Figure 20A:
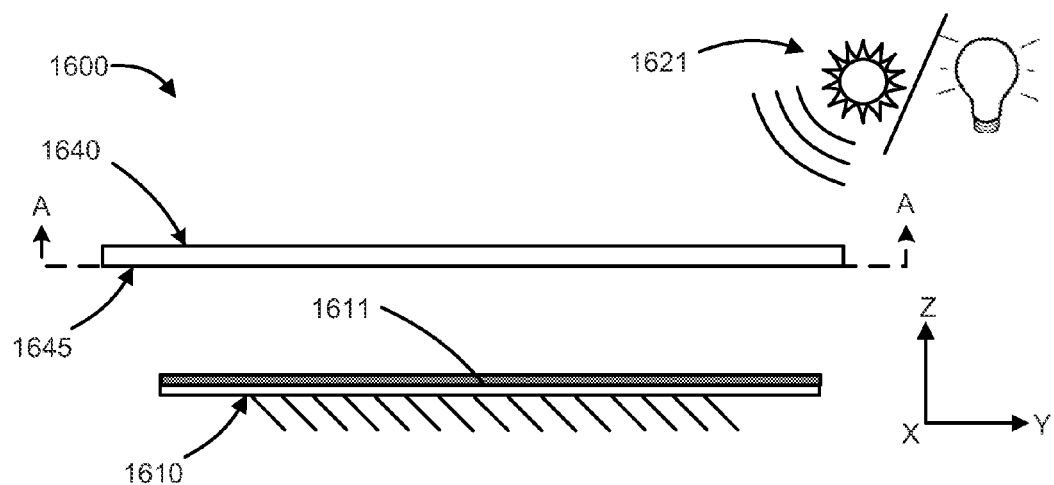
FIG. 20A illustrates a side schematic view of a sensor in accordance with still another example of the present disclosure.
Figure 20B:
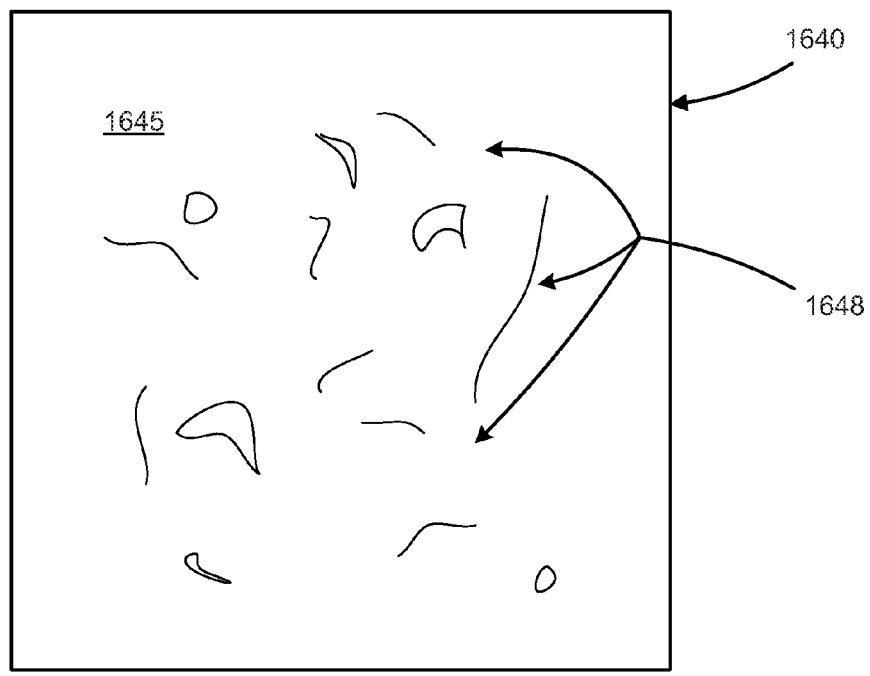
FIG. 20B illustrates a bottom view of the sensor of FIG. 20A taken along section A-A, representing a fiduciary in accordance with one example Reference will now be made to the exemplary embodiments illustrated, and specific language will be used herein to describe the same. It will nevertheless be understood that no limitation of the scope of the invention is thereby intended.

With reference to FIGS. 20A and 20B, illustrated is a sensor in accordance with another example of the present disclosure. The sensor 1600 is similar in many respects to the sensor 1400 of FIGS. 19A and 19B, except that the support structure 1640 comprises or is the actual object being sensed (or at least a portion thereof) rather than a separate component of the sensor that is attached or otherwise supported by the object being sensed. In addition, in one aspect, the fiduciary (or fiduciaries) 1648 can comprise a dedicated fiduciary applied to or disposed about the surface 1645, similar to those discussed above. In another aspect, the fiduciary 1648 can comprise one or more existing features or part of the surface 1645 itself. Keeping in mind that in this example the support structure 1640 is the object being sensed, and thus the surface 1645 comprises a surface of the object being sensed, identifying one or more fiduciaries that are actually a part of the object being sensed can facilitate functionality of the sensor 1600, particularly if the surface 1645 comprises various surface irregularities. In the example shown, the surface 1645 comprises a plurality of surface irregularities that can be identified and used as fiduciaries 1648. The imaging device 1610 having an image sensor 1611 can be supported relative to the support structure 1640 to be sensed (the object in this case, or a portion thereof), such that relative movement between the imaging device 1610 and the support structure 1640 is facilitated. The imaging device 1610 can be placed proximate to the fiduciaries 1648. Measurements in the various degrees of freedom in the sensor 1600 can be determinable in a similar manner as discussed above with respect to the sensor of FIGS. 19A and 19B.

Again, the sensor 1400 can further comprise a position module and any other components for facilitating functionality in a similar manner as discussed herein.

Similar to the example shown in FIG. 17, it is contemplated herein that a plurality of sensors like those shown in FIGS. 19A-20B with a plurality of imaging devices and fiduciaries can be used together to obtain images across the plurality of sensors, wherein the images can be stitched together. In one example, the plurality of imaging devices can be arranged in a manner so as to ensure a usable signal to at least one imaging device at any given time. In another example using a plurality of imaging devices, respective measurements from two or more of the plurality of imaging devices can be combined to determine relative movement.

In accordance with one embodiment of the present disclosure, a method for facilitating a displacement measurement is disclosed. The method can comprise providing an imaging device operative with a support structure; facilitating association of a fiduciary with the support structure, wherein the fiduciary is identifiable by the imaging device; facilitating relative movement between the support structure and the imaging device in at least one degree of freedom; and facilitating determination of a change in a characteristic or aspect of the fiduciary relative to the imaging device upon the relative movement of the support structure and the imaging device. Facilitating determination of a change in a characteristic or aspect of the fiduciary can comprise facilitating determination of one or both of a change in a size and a change in position of the fiduciary relative to the imaging device. Facilitating association of a fiduciary with the support structure can comprise disposing a fiduciary on a surface of the support structure, or identifying one or more surface irregularities in the support structure as the fiduciary or fiduciaries, wherein the support structure comprises a surface of an object to be sensed. The method can further comprise configuring the fiduciary to luminesce. In one example, this can comprise coating the fiduciary with a material that fluoresces (or forming the fiduciary from a material that fluoresces), and subjecting the fiduciary to light from a light source configured to cause the fiduciary to excite and fluoresce (emit light), wherein light emitted from the upon fiduciary can be used to determine relative movement between the imaging device and the support structure (and the fiduciary).

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A sensor comprising:
a light component support mechanically coupled to a single light source that generates a beam of light; and
an imager connected to the light component support via one or more elastic members, wherein the imager receives the beam of light, and converts the beam of light into an electric signal, wherein the light component support and the imager are movable relative to one another;
wherein the sensor determines a relative movement of the light component support and the imager in multiple degrees of freedom.

2. The sensor of claim 1, wherein the multiple degrees of freedom include:
a relative translation along an x-axis,
a relative translation along a y-axis,
a relative rotation about the x-axis,
a relative rotation about the y-axis,
a relative translation along a z-axis, and
a relative rotation about the z-axis;
wherein the x-axis, y-axis and z-axis are orthogonal.

3. The sensor of claim 2, wherein the beam of light comprises a conical shape.

4. The sensor of claim 2, wherein the beam of light comprises a cross-sectional area having a dimension in a direction of the x-axis greater than a dimension in a direction of the y-axis.

5. The sensor of claim 4, wherein the z-axis is substantially normal to the imager.

6. The sensor of claim 4, wherein the single source generates the beam of light having an oblong cross sectional area.

7. The sensor of claim 4, wherein the single light source emits light through an aperture.

8. The sensor of claim 4, wherein the single light source is oriented on an incline relative to the imager so as to provide the beam of light with an inclined angle of incidence on the imager.

9. The sensor of claim 8, wherein the light component support and the imager are situated substantially parallel to one another, and the single light source is mounted on the light component support at an incline relative to the imager.

10. The sensor of claim 8, wherein the light component support and the imager are situated substantially non-parallel to one another, and the single light source is mounted on the light component support in a substantially normal orientation to the light component support.

11. The sensor of claim 4, including at least one of a lens or a collimator that directs the beam of light from the single light source.

12. The sensor of claim 1, wherein the single light source directs the beam of light having an oblong cross section area onto the imager.

13. The sensor of claim 1, further comprising a plurality of light sources mechanically coupled to the light component support, wherein the plurality of light sources generate a plurality of beams of light, at least some of the plurality of light sources emitting light at different frequencies.

14. The sensor of claim 1, further comprising a plurality of light sources mechanically coupled to the light component support, wherein the plurality of light sources generate a plurality of beams of light, at least some of the plurality of light sources emitting light at different frequencies, wherein the imager further receives a cumulative, interference light emission having a plurality of edges.

15. The sensor of claim 1, wherein the imager comprises an image sensor selected from the group consisting of a charge-coupled device (CCD) sensor, a complementary metal oxide semiconductor (CMOS) sensor, and a N-type metal-oxide-semiconductor (NMOS or Live MOS) sensor.

16. A sensor comprising:
   at least one light source that directs a beam of light;
   an imager that receives the beam of light, and converts the beam of light into an electric signal;
   a light deflection surface proximate to the imager that receives the beam of light and deflects the beam of light onto the imager, wherein the light deflection surface and the imager are movable relative to one another; and
   one or more elastic members that connect the light deflection surface to the imager;
   wherein the sensor determines a relative movement of the light deflection surface and the imager in multiple degrees of freedom.

17. The sensor of claim 16, wherein the at least one light source is located substantially in a same plane as the imager, and directs the beam of light away from the imager towards the light deflection surface.

18. The sensor of claim 17, wherein the at least one light source and the imager are fixed relative to one another.

19. The sensor of claim 16, wherein the light deflection surface s planar and positioned substantially parallel to the imager.

20. The sensor of claim 16, wherein the light deflection surface is planar and initially oriented such that at least two of an x-axis, y-axis, or z-axis of the light deflection surface are non-parallel to the imager, and wherein relative movement of the imager and the light deflection surface is determined in at least five degrees of freedom.

21. The sensor of claim 16, wherein the light deflection surface is planar and initially oriented such that all three of an x-axis, y-axis, and z-axis of the light deflection surface are non-parallel to the imager, and wherein relative movement of the imager and the light deflection surface is determined in six degrees of freedom.

22. The sensor of claim 16, wherein the light deflection surface is non-planar, such that relative movement of the imager and the light deflection surface is determined in six degrees of freedom.

23. The sensor of claim 16, wherein the at least one light source and the imager receive power from a common side of the sensor.

24. The sensor of claim 16, wherein the at least one tight source includes two or more light sources that direct respective beams of light onto the light deflection surface, the imager further converts the respective beams of light to electric signals that are received by the sensor.

25. The sensor of claim 16, further comprising a plurality of light sources that generate a plurality of beams of light, at least some of the plurality of light sources emitting light at different frequencies, wherein the imager further receives a cumulative, interference light emission having a plurality of edges.

26. A method for facilitating a displacement measurement, comprising:
   directing, by a single light source, a beam of light, wherein the single light source is coupled to a light component support;
   receiving, by an imager, the beam of light;
   converting, by the imager, the beam of light into an electric signal, wherein the light component support and the imager are movable relative to one another; and
   facilitating relative movement of the imager and the light component, wherein the imager and the light component support are connected by one or more elastic members.

27. The method of claim 26, further comprising determining, by a sensor, a relative position of the imager and the light component based on a location of the beam of light on the imager.

28. A method for facilitating a displacement measurement, comprising:
   directing, by a single light source, a beam of light;
   receiving, by an imager, the beam of light,
   converting, by the imager, the beam of light into an electric signal;
   deflecting, by a light deflection surface, the beam of light onto the imager, wherein the light deflecting surface and the imager are movable relative to one another; and
   determining a relative movement of the light deflecting surface and the imager is in multiple degrees of freedom;
   wherein the imager and a light component support of the single light source are connected by one or more elastic members.

29. The method of claim 28, further comprising determining a relative position of the imager and the light deflection surface in the multiple degrees of freedom based on a location of the beam of light as reflected onto the imager.

* * * * *

UNITED STATES PATENT AND TRADEMARK OFFICE
CERTIFICATE OF CORRECTION

PATENT NO. : 9,851,196 B2
APPLICATION NO. : 14/690352
DATED : December 26, 2017
INVENTOR(S) : Fraser M. Smith It is certified that error appears in the above-identified patent and that said Letters Patent is hereby corrected as shown below:

In the Specification

In Column 24, Line 20, delete "patter" and insert -- pattern --, therefor.

In the Claims

In Column 28, Line 65, in Claim 6, delete "single" and insert -- single light --, therefor.

In Column 29, Line 59, in Claim 19, delete "surface s" and insert -- surface is --, therefor.

In Column 30, Line 16, in Claim 24, delete "tight" and insert -- light --, therefor.

Signed and Sealed this
Twenty-ninth Day of August, 2023

Katherine Kelly Vidal
*Director of the United States Patent and Trademark Office*